United States Patent
Takigawa et al.

(10) Patent No.: US 10,522,964 B2
(45) Date of Patent: Dec. 31, 2019

(54) FIBER LASER APPARATUS

(71) Applicant: FANUC CORPORATION, Yamanashi (JP)

(72) Inventors: Hiroshi Takigawa, Yamanashi (JP); Tetsuhisa Takazane, Yamanashi (JP); Hisatada Machida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/291,767

(22) Filed: Mar. 4, 2019

(65) Prior Publication Data
US 2019/0296513 A1    Sep. 26, 2019

(30) Foreign Application Priority Data

Mar. 26, 2018   (JP) .................. 2018-058923

(51) Int. Cl.
*H01S 3/30* (2006.01)
*H01S 3/067* (2006.01)
*H01S 3/04* (2006.01)
*H01S 3/0941* (2006.01)

(52) U.S. Cl.
CPC .......... *H01S 3/06708* (2013.01); *H01S 3/04* (2013.01); *H01S 3/067* (2013.01); *H01S 3/0675* (2013.01); *H01S 3/06745* (2013.01); *H01S 3/06754* (2013.01); *H01S 3/0941* (2013.01)

(58) Field of Classification Search
CPC ...... H01S 3/0675; H01S 3/04; H01S 3/06745; H01S 3/0941; H01S 3/067; H01S 3/06754; H01S 3/06708
See application file for complete search history.

(56) References Cited

U.S. PATENT DOCUMENTS

| 2016/0079728 | A1* | 3/2016 | Matsuyama | ........ H01S 5/02284 385/137 |
| 2016/0154182 | A1* | 6/2016 | Noguchi | .............. G02B 6/2808 385/96 |
| 2016/0187675 | A1* | 6/2016 | Kim | ........................ G02F 1/093 250/227.23 |

(Continued)

FOREIGN PATENT DOCUMENTS

| JP | 2002111101 A | 4/2002 |
| JP | 2005217140 A | 8/2005 |

(Continued)

*Primary Examiner* — Kinam Park

(74) *Attorney, Agent, or Firm* — Studebaker & Brackett PC

(57) ABSTRACT

A fiber laser apparatus includes a fiber laser oscillator that performs laser oscillation with laser light from at least one laser diode module, and includes a loop-shaped optical fiber formed with: a combiner in which at least two input side optical fibers are connected to one output side optical fiber that includes one output end; and an optical fiber for connection of both ends in which the output end of the output side optical fiber is connected to the input end of any one of the input side optical fibers, the optical fiber for connection of both ends including a light leakage means formed such that at least one of values among a numerical aperture, a core diameter and a mode field diameter of the optical fiber for connection of both ends is gradually reduced from a side which is connected to the output end toward a side which is connected to the input end.

14 Claims, 15 Drawing Sheets

(56) References Cited

U.S. PATENT DOCUMENTS

| | | | |
|---|---|---|---|
| 2018/0212395 A1* | 7/2018 | Kliner | G02F 1/3523 |
| 2018/0309262 A1* | 10/2018 | Machida | H01S 3/1312 |

FOREIGN PATENT DOCUMENTS

| | | | |
|---|---|---|---|
| JP | 2012209431 A | | 10/2012 |
| JP | 2013504786 A | | 2/2013 |
| JP | WO2016/002947 A1 | | 4/2017 |
| JP | 2017083508 A | | 5/2017 |

\* cited by examiner

FIBER LASER APPARATUS

This application is based on and claims the benefit of priority from Japanese Patent Application No. 2018-058923, filed on 26 Mar. 2018, the content of which is incorporated herein by reference.

BACKGROUND OF THE INVENTION

Field of the Invention

The present invention relates to a fiber laser apparatus. More specifically, the present invention relates to a high power fiber laser apparatus that performs machining such as cutting, welding or the like on a target to be machined and that has a structure where return light which is propagated in a direction opposite to output laser light within an optical fiber is converted into heat without re-reflection and local heat generation being involved so as to be completely eliminated and/or an excitation structure where excitation light for making a fiber laser oscillator oscillate is uniformly absorbed by the core of a signal light optical fiber such that heat generation in an amplification optical fiber is substantially uniform.

Related Art

Conventionally, in a fiber laser apparatus, methods are adopted in which, for example, in a return light attenuation unit, an optical fiber is spliced such that its axis is displaced and in which thus return light propagated through the optical fiber in a direction opposite to output laser light such as reflected light from a target to be machined or the like that may damage a fiber laser oscillator or the like or Stokes light (scattered light) caused by nonlinear induced scattering such as stimulated Raman scattering (SRS) that restricts the laser output of the fiber laser apparatus is converted into heat by a loss at a splice. However, as for this method, there are problems such as local increase of temperature of the splice due to the return light being lost locally at the splice, the need to provide several splices, the possibility of temperature increasing at specific splices due to the difficulty of controlling heat generation at individual splices to the same level, and the possibility of the return light being reflected off an end of the optical fiber within the return light attenuation unit so as to return to the fiber laser oscillator.

On the other hand, in the excitation structure of the fiber laser oscillator, when the amplification optical fiber is elongated such that the excitation light (pump light) is sufficiently absorbed into the core of the signal light optical fiber of the fiber laser oscillator to which a rare earth element such as Yb is doped, nonlinear induced scattering such as SRS occurs, increasing Stokes light and saturating the laser light output, thereby reaching a high-power operational limit. If the amplification optical fiber is shortened, the occurrence of nonlinear induced scattering such as SRS is reduced, but the excitation light is not sufficiently absorbed into the core of the signal light optical fiber, and thus the rate of absorption of the excitation light is lowered, thereby lowering the efficiency of laser light emission. Further, if the amplification optical fiber is excessively shortened, the heat generation rate per unit length following absorption of the excitation light into the core of the signal light optical fiber is increased, the operational limit is disadvantageously reached due to an increase in temperature. Hence, it is necessary to make the amount of excitation light absorbed into the core of the signal light optical fiber uniform in the length direction of the optical fiber as much as possible, thereby keeping the temperature of the amplification optical fiber uniform.

Structures are proposed in which excitation light is circulated such that the excitation light can be effectively utilized even when the amplification optical fiber is short, but since the excitation light is not circulated using optical fibers, flexibility, which is an advantage of optical fibers, is lost, or the structure involves loss in that the excitation light is not utilized for excitation during the circulation. As such, a structure which is practical in terms of manufacturing technology and the like has not been proposed. Further, conventionally, an excitation structure in which control is performed such that the amount of excitation light absorbed into the core of the signal light optical fiber is made uniform in the length direction of the optical fiber has not been proposed.

In the return light attenuation unit of the conventional fiber laser apparatus, methods such as converting return light to heat utilizing the loss at the splice by splicing the optical fiber such that its axis is displaced are adopted. For example, patent document 1 discloses an optical fiber laser apparatus which uses an amplification optical fiber as an amplification medium in a laser oscillator so as to generate laser light. The optical fiber laser apparatus described above includes: an output optical fiber which emits the laser light to the outside; a return light attenuation unit which performs attenuation processing at least on return light that is propagated through the output optical fiber in a direction opposite to the laser light; a heat conversion means which is provided in the return light attenuation unit and converts the return light into heat; a temperature monitoring means which measures an increase in the temperature of the return light attenuation unit caused by the heat generation of the heat conversion means; and a control unit which lowers or stops the output of the laser light when the temperature measured with the temperature monitoring means reaches a predetermined threshold value or more. Patent document 1 also discloses an optical fiber laser apparatus in which the heat conversion means splices the optical fiber in the return light attenuation unit such that its axis is displaced. In the optical fiber laser apparatus described above, since the return light is attenuated by a loss at an axis displacement splice so as to be converted into heat, as described previously, the temperature of the axis displacement splice may be locally increased, damaging the return light attenuation unit. Since the magnitude of the loss at the axis displacement splice differs depending on a slight difference in the degree of the axis displacement, it is difficult to accurately control the amount of attenuation. Hence, in the optical fiber laser apparatus described above, it is necessary to provide a plurality of axis displacement splices in the optical fiber in series in order to sufficiently attenuate the return light, resulting in a problem that a high manufacturing cost is needed.

Patent document 1 further discloses an optical fiber laser apparatus where the heat conversion means formed with the irradiated surface of a thermal conductor to which the return light emitted from an end of the optical fiber provided in the return light attenuation unit is applied, suggesting that the return light is not sufficiently attenuated solely by the axis displacement splicing so as to reach the end of the optical fiber provided in the light attenuation unit. Hence, patent document 1 indicates that the return light reaching the end of the optical fiber provided in the light attenuation unit may be re-reflected off the end of the optical fiber so as to be returned toward the fiber laser apparatus. As described above, the return light attenuation unit disclosed in patent document 1 is not a structure in which the return light can be converted into heat substantially uniformly over a substantially total length of the optical fiber provided in the return light attenuation unit, such that the return light is reliably prevented from being returned by the re-reflection.

Further, conventionally, in fiber laser apparatuses, various end pumping structures and side pumping structures have been developed in order to make the core of the signal light optical fiber efficiently absorb the excitation light. However, the realization of high outputs is often restricted due to occurrence of optical nonlinearity including SRS. The occurrence of SRS increases Stokes light, and the laser light output is reduced by an amount corresponding to the increase in the Stokes light. In order to increase the optical nonlinearity threshold value, it is effective to increase the core diameter of the signal light optical fiber, to decrease a NA (numerical aperture) and to shorten the effective length of a nonlinear interaction. However, the enlargement of the core diameter induces an increase in higher mode number which adversely affects the quality of the output laser beam. In order to decrease the NA, it is necessary to decrease the difference in refractive index between the core and a cladding, but it is difficult to manufacture a high-quality fiber having a low refractive index difference. Moreover, the sensitivity towards bending load is increased, and problems such as bend loss of the fiber as well as degradation in the quality of the beam caused by mode coupling resulting from micro-bending arise. On the other hand, the effective length of the nonlinear interaction depends on the length of the fiber, but as the length of the fiber is increased, the Stokes light rapidly increases. By the occurrence of SRS, the Stokes light increases over the total length of the fiber including not only the interior of a delivery fiber but also a fiber laser resonator unit. As for the delivery fiber, since the necessary length thereof is determined in terms of the flexibility of the machining setup, in order to reduce the occurrence of optical nonlinearity, it is preferable to shorten the amplification optical fiber if possible. However, when the amplification optical fiber is excessively shortened, since the heat generation rate per unit length is increased, problems such as reaching the operational limit due to an increase in temperature as well as the excitation light not being sufficiently absorbed into the core of the signal light optical fiber arise. Hence, as described previously, it is necessary to make the amount of excitation light absorbed into the core of the signal light optical fiber uniform in the length direction of the optical fiber as much as possible so as to keep the temperature of the amplification optical fiber uniform.

In the case of the end pumping described previously, the amplification optical fiber includes a double cladding, and when the excitation light is propagated through an inner cladding of a non-rotationally symmetric shape while being subjected to mode mixing, the excitation light is absorbed into rare earth ions such as Yb with which the core is doped such that excitation is performed. When the mode mixing is performed ideally, the effective absorption coefficient of the excitation light is absorption coefficient of core×(core diameter/cladding diameter)$^2$, and the amplification optical fiber needs to have the length of about the reciprocal of the effective absorption coefficient. However, when the mode mixing within the actual inner cladding is not complete, the excitation light having a large NA is absorbed into the first half of the amplification optical fiber with the absorption coefficient described above, and thereafter, the excitation light having a small NA is propagated with an absorption coefficient lower than the absorption coefficient described above. Hence, in order to sufficiently absorb the excitation light, the length of the fiber is inevitably increased. However, the effect of increasing absorption of the excitation light by elongation of the length of the fiber is limited, and it is likely that the excitation light is not sufficiently absorbed into the core.

As described previously, in order to reduce the possibility that nonlinear induced scattering such as SRS occurs, it is preferable to shorten the amplification optical fiber. In order to do so, it is necessary to increase the absorption coefficient of the excitation light. In order to increase the absorption coefficient of the core, it is effective to increase the concentration of a rare earth element such as Yb doped to the core or to reduce an aspect ratio of core diameter/cladding diameter. However, even when the absorption coefficient of the excitation light is increased, if the amplification optical fiber is excessively shortened, as described previously, the heat generation rate per unit length is increased such that the operational limit due to an increase in temperature is reached, resulting in the power of the excitation light which can be injected becoming restricted. Moreover, it is necessary to give consideration to the fact that, when the concentration of a rare earth element such as Yb added is increased in order to increase the absorption coefficient of the core, the amount of excitation light absorbed per unit length is increased, and the heat generation rate per unit length is increased by excitation, such that, even if the power of the excitation light is small, the operational limit due to an increase in temperature is reached. As described above, for amplification optical fibers, an optimum design with consideration given to various factors is needed.

However, in any case, if the amount of excitation light absorbed per unit length of the amplification optical fiber is nonuniform, the length of the amplification optical fiber necessary for sufficiently absorbing the excitation light is increased. Hence, alongside problems that it becomes highly likely that nonlinear induced scattering such as SRS occurs or that it becomes impossible to sufficiently absorb the excitation light, there arises a problem that due to the heat generation rate per unit length becoming nonuniform as well, the power of the excitation light which can be injected is restricted by an increase in the temperature of a part whose temperature is the highest. Hence, it is very important that the amount of excitation light absorbed per unit length of the amplification optical fiber be made uniform as much as possible. However, in the case of the end pumping, as described previously, since the part closer to the input side of the excitation light absorbs a larger amount of excitation light and generates a larger amount of heat by the absorption, the heat generation rate becomes nonuniform in the length direction of the fiber.

Even in the case of the side pumping described previously, similar problems arise. For example, in a side pumping structure in which an excitation light optical fiber and the signal light optical fiber are substantially in intimate contact with each other and are extended parallel to each other, there arises a problem that, when the amplification optical fiber becomes relatively short, part of the excitation light propagated through the excitation light optical fiber is not transferred to the signal light optical fiber and is not utilized for excitation, resulting in that the rate of absorption of the excitation light into the core is lowered. Further, when a mechanism in which the propagation of the excitation light from the excitation light optical fiber to the signal light optical fiber is made uniform in the length direction of the amplification optical fiber is not provided, as in the case of the end pumping, the amount of excitation light absorbed and the heat generation rate become nonuniform in the length direction of the amplification optical fiber.

For example, patent document 2 discloses an optical fiber which is extended along a fiber axis in the longitudinal direction. The optical fiber described above includes: at least one cladding which is concentrated along the fiber axis; and an elongated multimode (MM) core which is coaxial with the one cladding and is surrounded by the one cladding, wherein the multimode core has a cross section which is shaped to have a double bottle neck such that it provides excitation of the basic mode only in practicality as well as guidance without distortion. Patent document 2 also discloses an optical fiber which includes input and output mode conversion unit regions, a center region, an input end region and an output end region which will be described below. The input and output mode conversion unit regions each have cross sections which are shaped to have the double bottle neck of the MM, which are separated from each other in an axial direction such that each of the conversion unit regions has a relatively small end and a relatively large end that are set to have a truncated cone shape. The center region is formed to have such a uniform dimension that the center region bridges over the individual large ends of the input and output conversion unit regions. The input end region is formed to have such a uniform dimension that the input end region is extended into the small end of the input conversion unit region, and is configured so as to respond to a single mode input beam emitted to the input end region, thereby exciting in practicality only the basic mode therein. The output end region is formed to have such a uniform dimension that the output end region is extended from the output conversion unit so as to output an emission practically in the basic mode and receives the basic mode from the output conversion unit. The optical fiber described above is formed such that the MM core has a step type refractive index profile which includes a concave portion located in the center, and the single mode input beam in the input end region and the basic mode each have substantial Gaussian intensity profiles whose shapes are set such that their respective mode field diameters substantially match each other. In the optical fiber described above, by providing the shape of the double bottle neck and the step type refractive index profile having the concave portion in the center, the diameters of the multimode cores in the center portions of both the bottle necks are increased while the excitation and amplification in a higher mode are being reduced, resulting in an increase in the threshold value for nonlinearity. However, patent document 2 does not indicate a solution for the problem that as the core diameter is increased, the sensitivity to the bending load is increased. In addition, while patent document 2 discloses the arrangement of a side pumping optical fiber and the configuration of a side pumping technology, it does not disclose solutions for problems such as the excitation light not being sufficiently absorbed into the core or the excitation light not being uniformly absorbed into the length direction of the amplification optical fiber, resulting in the heat generation rate becoming nonuniform.

Patent document 3 discloses a laser light source apparatus in which, with a semiconductor laser, excitation light having a predetermined wavelength is applied into an optical fiber formed of a core portion and a cladding portion from a side surface so as to excite a laser active substance within the core portion, thereby resonating it within the optical fiber to output light having a desired wavelength from the output end of the optical fiber. The laser light source apparatus described above includes: an optical waveguide core formed in the shape of a ring which has a predetermined cross section and a refractive index substantially equal to the cladding portion; an optical waveguide cladding which has a refractive index lower than that of the optical waveguide core and which surrounds the optical waveguide core; an optical fiber in which part or the whole thereof is embedded along the ring shape within the optical waveguide core; and at least one light guide portion which has a refractive index equal to the optical waveguide core, which is coupled to that of the optical waveguide core within the optical waveguide cladding and guides the excitation light so as to propagate and circuit the excitation light within the optical waveguide core in a given direction. Patent document 3 discloses that, since the laser light source apparatus described above efficiently joins the excitation light guided from the light guide portion into the optical waveguide so as to propagate and circle the excitation light in the given direction along the ring shape, the excitation light can be utilized without waste, and thus it is possible to obtain high coupling efficiency. However, since a medium through which the excitation light is propagated is not an optical fiber that is conventionally generally used, as compared with the optical fiber, absorption within the waveguide core is increased, and thus a large loss is caused in the circling of the excitation light. Moreover, since the medium through which the excitation light is propagated is not flexible like optical fiber, there arises problems in terms of manufacturing such as, particularly when the amplification optical fiber is intended to be slightly elongated, the optical waveguide itself becoming significantly enlarged. Although patent document 3 discloses that, as the length of the signal light optical fiber, a length corresponding to about one revolution within the ring optical waveguide core can be preferably acquired, when an attempt is made to realize a high-power laser apparatus, as described previously, the heat generation rate per unit length is increased, thereby reaching the operational limit due to an increase in temperature. Hence, in the structure of the laser light source apparatus disclosed in patent document 3, it is impossible to realize a high-power laser apparatus. Patent document 3 further discloses, as the materials of the ring optical waveguide core and the ring optical waveguide cladding, PMMA (acrylic), PC (polycarbonate), silicone, styrene acrylonitrile (SAN), glass and the like. However, due to the fact that all the materials have low thermal conductivities as well as structures in which heat generated in the signal light optical fiber is unlikely to be dissipated, realizing a high-power laser apparatus has become even more difficult. Patent document 3 also discloses that one of its purposes is to make the heat generation rate substantially uniform in the length direction of the fiber. Although it is likely that providing a plurality of light guide portions can achieve the purpose to some extent, the closer a part is to the input of the excitation light joined from the light guide portion, the more increased the absorption of the excitation light into the part will become, and the more increased the heat generation rate by the absorption will become. Hence, patent document 3 does not disclose a sufficient solution for the problem that the heat generation rate is made nonuniform in the length direction of the fiber. As described above, the structure disclosed in patent document 3 is a structure which is not suitable for a high-power fiber laser apparatus in the first place where the heat generation of the fiber becomes a problem in actuality.

Patent document 4 discloses a fiber laser apparatus that includes: an excitation light source which generates excitation light for exciting a laser active substance; an input member for inputting the excitation light generated from the excitation light source into the laser active substance; and an optical fiber which includes the laser active substance, wherein the laser active substance is excited by the excitation light input from the input member and which outputs laser light from an end portion. The input member has a shape in which a columnar member having an entrance surface for receiving the excitation light from the excitation light source formed at one end is bent such that at least part thereof forms an arc. The optical fiber is wound around the outer circumferential portion of the input member substantially parallel to the bus of the input member, and the input member makes contact with at least part of the side surface of the optical fiber. The laser active substance is excited by the excitation light which is input to the optical fiber through the contact part. Patent document 4 also discloses a structure in which the other end that is not the entrance surface of the input member makes contact with the side surface of the input member through a high refractive member having a refractive index higher than the input member and in which the excitation light is circulated in the input member. Hence, although patent document 4 discloses, like patent document 3 described previously, the structure for circulating the excitation light, the excitation light is still not propagated within the fiber. In patent document 4, as the input member for propagating the excitation light, an input member is illustrated in which a cylindrical member having a diameter of 6 mm and made of quartz glass is bent in the shape of a circular ring having a radius of 50 mm. The input member has, unlike an optical fiber, a structure which is not flexible. However, placing a plurality of optical fibers on the surface of the cylindrical member which is not flexible and is bent in the shape of a circular ring as shown in patent document 4 is very difficult in terms of manufacturing technology, and it is a structure with low feasibility. Further, although the fiber laser apparatus is configured such that the other end which is not the entrance surface of the input member makes contact with the side surface of the input member through the high refractive member having a refractive index higher than the input member to allow the excitation light to circulate in the input member, since the excitation light is somewhat reflected off an interface between the input member having a low refractive index and the high refractive member having a high refractive index, there arises a problem that, when the length of the input member is short as illustrated, the reflected excitation light may be returned to the excitation light source, thereby damaging the excitation light source. In order to reduce the return of the reflected light to the excitation light source or the rate of the excitation light not utilized for excitation, elongating the total length of the input member is considered. However, since the input member is not flexible, the elongation of the total length of the input member involves problems such as an increase in the size of the apparatus, and therefore is unrealistic. In the part of the optical fiber which is close to the entrance surface of the input member, since a large amount of excitation light is absorbed and the heat generation rate by the absorption is also large, the heat generation rate becomes nonuniform in the length direction of the fiber. However, patent document 4 does not disclose a solution for the problems described above.

Patent document 5 discloses an optical part that includes: an amplification optical fiber having a core to which an active element is doped and a cladding which propagates excitation light for exciting the active element; and an optical coupling unit in which a plurality of cladding portions that are mutually discontinuous in the longitudinal direction of the amplification optical fiber are integrated along the longitudinal direction so as to be optically coupled to each other. In the optical part, the cladding portions which are mutually discontinuous are optically coupled to each other so as to form a loop in the amplification optical fiber. Hence, the optical part appears to have a similar shape to the structures disclosed in patent documents 3 and 4. However, in the structure disclosed in patent document 5, since the propagation mode of part of the excitation light which is propagated through the cladding portions of the optical coupling unit is disturbed while the excitation light is being propagated through the cladding portions, the light which reaches the optical coupling unit as skew light is emitted due to the disturbance of the propagation mode as the normal excitation light from the optical coupling unit. Hence, it is assumed that the skew light is reduced and that thus it is possible to efficiently absorb the excitation light in the amplification optical fiber. In other words, in the optical part disclosed in patent document 5, at least a large proportion of the excitation light propagated to the loop-shaped amplification optical fiber is not circulated within the loop of the loop-shaped amplification optical fiber but is propagated to the other end of the amplification optical fiber extended from the optical coupling unit of the loop-shaped amplification optical fiber. Hence, at a glance, the optical part described above appears to have a similar structure patent documents 3 and 4 due to the presence of the loop, but the function and the configuration thereof completely differ from those of the structures disclosed in patent documents 3 and 4. In patent document 5, similarly, the closer a part is to the excitation light source, the more increased the absorption of the excitation light into the part becomes and the more increased the heat generation rate by the absorption becomes, resulting in the heat generation rate becoming nonuniform in the length direction of the fiber, but patent document 5 does not disclose a solution for the problem.

In addition to the conventional technology described above, conventional technologies including a loop-shaped optical fiber are disclosed, such as the example of patent document 6. Patent document 6 discloses a light source apparatus that has a light source which outputs light having a first wavelength, a nonlinear waveguide, a light branch element, an output unit, an optical amplification unit and an optical coupling element. The nonlinear waveguide generates, by an optical parametric effect, from the light having the first wavelength, light which includes light having a second wavelength and light having a third wavelength. The light branch element branches light which includes the light having the first wavelength, the light having the second wavelength and the light having the third wavelength output from the nonlinear waveguide according to the wavelength. The output unit outputs light which includes at least part of the light having the third wavelength branched by the light branch element. The optical amplification unit amplifies light which includes at least part of the light having the second wavelength branched by the light branch element. The optical coupling element couples light which includes the light output from the light source having the first wavelength and the light amplified by the optical amplification unit having the second wavelength so as to input it to the nonlinear waveguide. Since the laser light is circulated and propagated within the loop-shaped optical fiber, this technology appears to be similar to the technologies disclosed in patent documents described above; However, as it is clear from the fact that the light branch element which branches light is provided in the loop, the problem, the purpose and the configuration in this technology completely differ from those in the technologies disclosed in patent documents described above.

Patent Document 1: Japanese Re-Publication of PCT Application Publication No. 2016/002947

Patent Document 2: Japanese Unexamined Patent Application (Translation of PCT Application), Publication No. 2013-504786
Patent Document 3: Japanese Unexamined Patent Application, Publication No. 2002-111101
Patent Document 4: Japanese Unexamined Patent Application, Publication No. 2005-217140
Patent Document 5: Japanese Unexamined Patent Application, Publication No. 2012-209431
Patent Document 6: Japanese Unexamined Patent Application, Publication No. 2017-83508

SUMMARY OF THE INVENTION

As described above, in the return light attenuation unit of the conventional fiber laser apparatus, when the return light is attenuated with structures such as axis displacement splicing of the optical fiber within the return light attenuation unit or the like, heat is locally generated in the axis displacement splice where a loss is caused, the temperature of the part is increased and thus, the reliability of the return light attenuation unit may be lowered. Further, the return light may not be completely attenuated in the axis displacement splice, being re-reflected off the optical fiber end of the return light attenuation unit so as to be returned to the fiber laser oscillator, thereby possibly lowering the reliability of the fiber laser oscillator. Hence, a highly reliable fiber laser apparatus is required which includes a return light elimination module which is not a return light attenuation unit and can reliably prevent the entered return light from being re-reflected off the end of the optical fiber or the like so as to be returned again to the fiber laser oscillator, and in the return light elimination module, wherein the return light substantially uniformly leaks from a predetermined range of the length direction of the optical fiber within the return light elimination module and is converted into heat, the heat generation rate per unit length of the optical fiber in the predetermined range of the optical fiber within the return light elimination module is made substantially uniform and the temperature of the optical fiber in the predetermined range of the optical fiber within the return light elimination module can also be made substantially uniform.

In the fiber laser oscillator of the conventional fiber laser apparatus, in the case of the end pumping, as a part is closer to the input side of the excitation light, the amount of excitation light absorbed into the part is increased, and the heat generation rate by the absorption is increased, with the result that the heat generation rate is made nonuniform in the length direction of the fiber. Even in the case of the side pumping, when a mechanism that makes the propagation of the excitation light from the excitation light optical fiber to the signal light optical fiber uniform in the length direction of the amplification optical fiber is not provided, as in the case of the end pumping, the amount of excitation light absorbed becomes nonuniform in the length direction of the amplification optical fiber. Consequently, the heat generation rate becomes nonuniform. When the heat generation rate becomes nonuniform in the length direction of the amplification optical fiber, there arises a problem that the power of the excitation light which can be injected is restricted due to an increase in the temperature of a part whose temperature becomes the highest. When the amount of excitation light absorbed is nonuniform in the length direction of the amplification optical fiber and hence a part where the amount of excitation light absorbed is small is present, part of the excitation light which is injected may not be utilized so as to be lost, resulting in that the rate of absorption of the excitation light in the core may be lowered. When the amount of excitation light absorbed is nonuniform in the length direction of the amplification optical fiber and hence the part where the amount of excitation light absorbed is small is present, in order to reduce the excitation light which is not utilized for the excitation so as to be lost, it is necessary to elongate the amplification optical fiber as compared with a case where the amount of excitation light absorbed is uniform in the length direction of the amplification optical fiber. Consequently, it is highly likely that nonlinear induced scattering such as SRS occurs. Hence, a high-power, highly-efficient fiber laser apparatus is required which includes a fiber laser oscillator that has an excitation structure wherein the amount of excitation light absorbed can be made uniform in the length direction of the amplification optical fiber, the heat generation rate and temperature distribution in the length direction of the amplification optical fiber are made uniform, the power of the excitation light which reaches the operational limit caused by an increase in temperature can be increased, the excitation light which is not utilized for the excitation so as to be lost can be reduced without elongating the length of the amplification optical fiber beyond an originally required length, the rate of absorption of the excitation light into the core is high and it is unlikely that the high-power operational limit caused by the occurrence of nonlinear induced scattering such as SRS is reached.

Hence, it is necessary to provide an optical fiber structure in which light entering an optical fiber from the input end of the optical fiber can substantially uniformly leak in a predetermined range of the length direction of the optical fiber in the length direction of the optical fiber from the optical fiber to the outside of the optical fiber, in which the entered laser light is prevented from being reflected so as to be returned to the input end of the optical fiber and the laser light is prevented from leaking from the output end of the optical fiber and in which the light substantially leaks to the outside from only the optical fiber in the predetermined range of the length direction of the optical fiber.

Hence, an object of the present invention is to provide a fiber laser apparatus having an optical fiber structure in which light entering an optical fiber from the input end of the optical fiber can substantially uniformly leak in a predetermined range of the length direction of the optical fiber in the length direction of the optical fiber from the optical fiber to the outside of the optical fiber, wherein the entered light is prevented from being reflected so as to be returned to the input end of the optical fiber or from leaking from an output end other than the input end of the optical fiber, and the light is substantially leaking to the outside from only the optical fiber in the predetermined range of the length direction of the optical fiber.

(1) A fiber laser apparatus according to the present invention is a fiber laser apparatus (for example, a fiber laser apparatus 16 which will be described later) which includes a fiber laser oscillator (for example, a fiber laser oscillator 17 which will be described later) that is excited by laser light from at least one laser diode module (for example, a laser diode modules 22 which will be described later) so as to perform laser oscillation, the apparatus including a loop-shaped optical fiber (for example, a loop-shaped optical fiber 1 which will be described later) formed with: a combiner (for example, a combiner 2 which will be described later) in which at least two input side optical fibers (for example, an input side optical fibers 3 which will be described later) each including input ends (for example, an input end 5 which will be described later) are connected to one output side optical fiber (for example, an output side optical fiber 4 which will be described later) including one output end (for example, an output end 6 which will be described later); and an optical fiber for connection of both ends (for example, an optical fiber for connection of both ends 7 which will be described later) in which the output end of the output side optical fiber of the combiner is connected to the input end of any one of the input side optical fibers, the optical fiber for connection of both ends including a light leakage means formed such that at least one of values among a numerical aperture, a core diameter and a mode field diameter of the optical fiber for connection of both ends is gradually reduced from a side which is connected to the output end of the output side optical fiber toward a side which is connected to the input end of the input side optical fiber.

(2) Preferably, in the fiber laser apparatus according to (1), in the loop-shaped optical fiber, there need not be provided a light extraction means nor a light branch means which extract light propagated within the loop-shaped optical fiber from the loop-shaped optical fiber, except for the light leakage means.

(3) Preferably, in the fiber laser apparatus according to (1) or (2), the combiner satisfies a relationship of (the diameter of the entire branch of the input side optical fibers)×(the numerical aperture of the input side optical fibers)≤(the core diameter of the output side optical fiber)×(the numerical aperture of the output side optical fiber).

(4) Preferably, in the fiber laser apparatus according to any one of (1) to (3), the loop-shaped optical fiber is formed is configured such that, with regards to a first relational formula group including three relational formulas $NA_1 \leq NA_2$, $D_1 \leq D_2$ and $MFD_1 \leq MFD_2$ wherein the numerical aperture, the core diameter and the mode field diameter of the output side optical fiber in a position in which the output side optical fiber and the optical fiber for connection of both ends are connected together are respectively represented as $NA_1$, $D_1$ and $MFD_1$, and the numerical aperture, the core diameter and the mode field diameter of the optical fiber for connection of both ends in the position in which the output side optical fiber and the optical fiber for connection of both ends are connected together are respectively represented as $NA_2$, $D_2$ and $MFD_2$, as well as to a second relational formula group including three relational formulas $NA_3 \leq NA_4$, $D_3 \leq D_4$ and $MFD_3 \leq MFD_4$ wherein the numerical aperture, the core diameter and the mode field diameter of the optical fiber for connection of both ends in a position in which the optical fiber for connection of both ends and the input side optical fiber are connected together are respectively represented by $NA_3$, $D_3$ and $MFD_3$, and the numerical aperture, the core diameter and the mode field diameter of the input side optical fiber in the position in which the optical fiber for connection of both ends and the input side optical fiber are connected together are respectively represented by $NA_4$, $D_4$ and $MFD_4$, all the relational formulas included in the first and second relational formula groups hold true.

(5) Preferably, in the fiber laser apparatus according to any one of (1) to (4), the loop-shaped optical fiber forms a plurality of loops.

(6) Preferably, in the fiber laser apparatus according to any one of (1) to (5), when the input side optical fibers are bundled in a hexagonal close-packed structure, the number of the input side optical fibers in the combiner is set such that a cross-sectional outer shape of the bundle is close to a circle.

(7) Preferably, in the fiber laser apparatus according to any one of (1) to (6), the loop-shaped optical fiber is applied to a return light elimination module (for example, a return light elimination module 21 which will be described later) for eliminating return light which is propagated in a direction opposite to output laser light from a signal light optical fiber (for example, a signal light optical fiber 35 which will be described later) of the fiber laser oscillator and which is passed through a high-reflecting fiber Bragg grating (for example, a high-reflecting fiber Bragg grating 19 which will be described later).

(8) Preferably, in the fiber laser apparatus according to (7), at least part of the loop-shaped optical fiber is thermally connected to a thermal conductive member (for example, a thermal conductive member 29 which will be described later) which is thermally connected to a heat dissipation means.

(9) Preferably, in the fiber laser apparatus according to (7) or (8), a light detection means (for example, a light detection means 28 which will be described later) which detects light that leaks from the optical fiber between the return light elimination module and the high-reflecting fiber Bragg grating.

(10) Preferably, in the fiber laser apparatus according to any one of (1) to (6), the loop-shaped optical fiber is applied to an excitation light optical fiber for side pumping (for example, an excitation light optical fiber 34 which will be described later) which is adjacent to a signal light optical fiber (for example, a signal light optical fiber 35 which will be described later) of the fiber laser oscillator so as to be extended parallel thereto.

(11) Preferably, in the fiber laser apparatus according to (10), at least part of the excitation light optical fiber which is adjacent to the signal light optical fiber so as to be extended parallel thereto and the signal light optical fiber is covered with a sleeve (for example, a sleeve 36 which will be described later) which has a refractive index lower than that of a cladding (for example, a cladding 11 which will be described later) of the signal light optical fiber.

(12) Preferably, in the fiber laser apparatus according to (10) to (11), a plurality of the excitation light optical fibers is arranged adjacent to the one signal light optical fiber.

(13) Preferably, in the fiber laser apparatus according to any one of (10) to (12), the excitation light optical fibers are arranged adjacent to the one signal light optical fiber, and a direction in which light is propagated through at least one of the excitation light optical fibers is opposite to a direction in which light is propagated through the other excitation light optical fiber.

(14) Preferably, in the fiber laser apparatus according to any one of (1) to (6), the loop-shaped optical fiber is applied both to a return light elimination module (for example, a return light elimination module 21 which will be described later) for eliminating return light which is propagated in a direction opposite to output laser light from a signal light optical fiber (for example, a signal light optical fiber 35 which will be described later) of the fiber laser oscillator and which is passed through a high-reflecting fiber Bragg grating (for example, a high-reflecting fiber Bragg grating 19 which will be described later) and to an excitation light optical fiber for side pumping (for example, an excitation light optical fiber 34 which will be described later) which is adjacent to the signal light optical fiber of the fiber laser oscillator so as to be extended parallel thereto.

According to the present invention, it is possible to provide a fiber laser apparatus including an optical fiber structure in which light entering an optical fiber from the input end of the optical fiber can substantially uniformly leak in a predetermined range of the length direction of the optical fiber in the length direction of the optical fiber from the optical fiber to the outside of the optical fiber, wherein the entered light is prevented from being reflected so as to be returned to the input end of the optical fiber and from leaking from the output end of the optical fiber, and the light is substantially leaking to the outside from solely the optical fiber in the predetermined range of the length direction of the optical fiber.

DETAILED DESCRIPTION OF THE INVENTION

Figure 1:
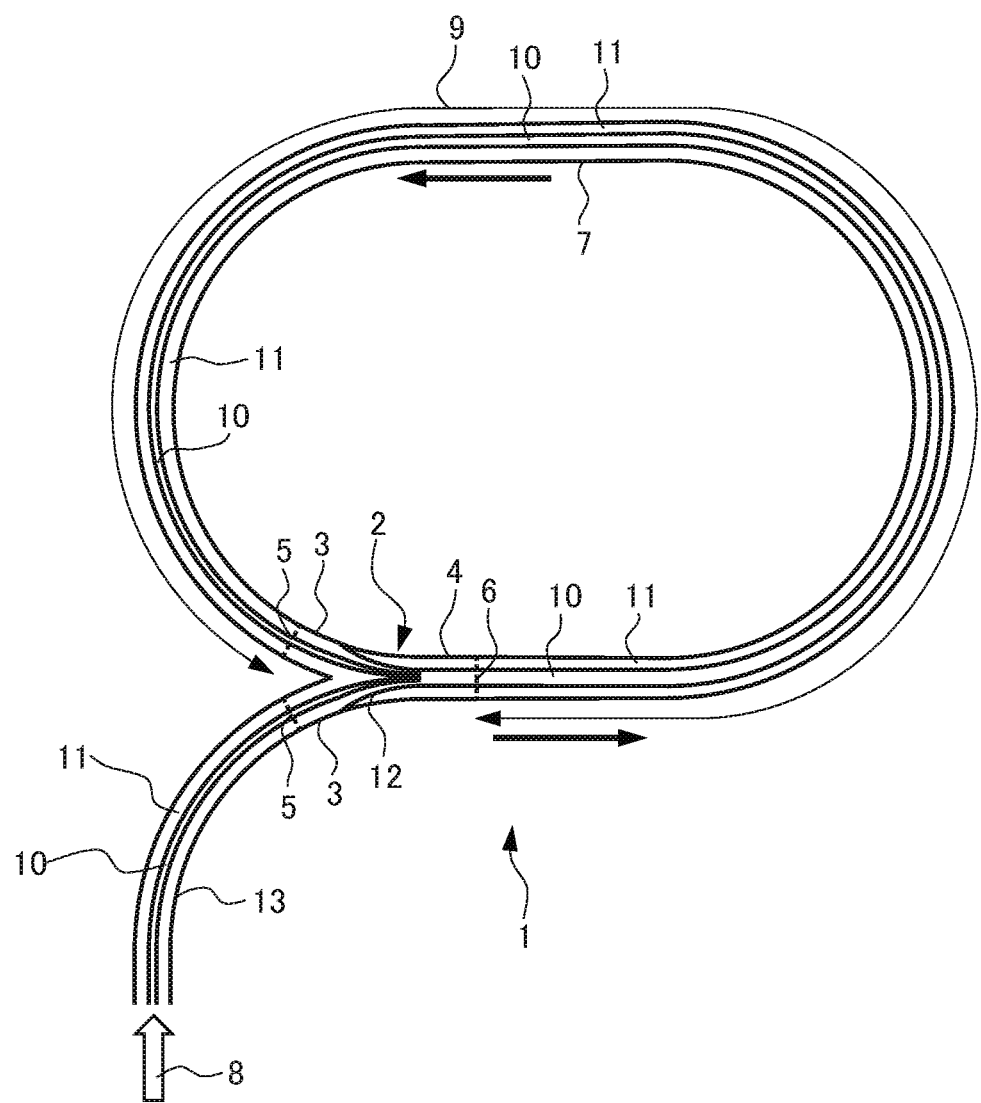
FIG. 1 is a schematic view of a loop-shaped optical fiber which is used in a fiber laser oscillator of a fiber laser apparatus according to a first embodiment of the present invention.

Embodiments of a fiber laser apparatus including a loop-shaped optical fiber according to the present invention will be described below with reference to drawings. In the individual drawings, the same members are identified with the same reference numerals. It is assumed that members identified with the same reference numerals in different drawings are constituent elements having the same functions. For ease of viewing of the drawings, scales are changed as necessary. In the present specification, the expression "optical fibers are connected to each other" is used in the sense that the end surfaces of optical fibers are connected by splicing and are optically coupled such that light propagated from one optical fiber is propagated to the other optical fiber. In the individual drawings, a white arrow schematically represents light rays. A thick solid arrow line schematically represents an average propagation direction in which light is propagated within the individual optical fibers. A thin line with arrows on both sides is an extension line for indicating a range. A thick broken line perpendicular to the optical fiber represents the splicing point of the optical fibers.

First Embodiment

FIG. 1 is a schematic view of a loop-shaped optical fiber which is used in a fiber laser oscillator of a fiber laser apparatus according to a first embodiment of the present invention. In FIG. 1, the optical fiber part is shown by a schematic cross-sectional view in which a plane including the center line of the optical fiber is the cross section. In FIG. 1, in order to describe the loop-shaped optical fiber, the fiber laser apparatus and the fiber laser oscillator are omitted.

As shown in FIG. 1, the loop-shaped optical fiber 1 includes a combiner 2 and an optical fiber for connection of both ends 7. The combiner 2 includes a plurality of input side optical fibers 3 each of which includes an input end 5 and one output side optical fiber 4 which includes one output end 6, and the plurality of input side optical fibers 3 is coupled to the same input end of the output side optical fiber 4 so as to be connected thereto. The combiner 2 of the present embodiment includes two input side optical fibers 3, 3, and each of the input side optical fibers 3, 3 are coupled to the same input end of the output side optical fiber 4 so as to be connected thereto, with the result that the combiner 2 is formed in the shape of the letter Y. In the connection part of the input side optical fibers 3, 3 and the output side optical fiber 4, a fiber taper portion 12 is provided.

The optical fiber for connection of both ends 7 couples and connects the output end 6 of the output side optical fiber 4 to the input end 5 of any one of the input side optical fibers 3 in the shape of a loop. In this way, it is configured such that at least part of entering light that enters the combiner 2 from the input end 5 of at least any one of the input side optical fibers 3 other than the input side optical fiber 3 which is connected to the optical fiber for connection of both ends 7 is passed through the output end 6 and the optical fiber for connection of both ends 7 in this order, and enters again the combiner 2 from the input end 5 that is connected to the optical fiber for connection of both ends 7.

Specifically, the end surface of the core 10 of the output end 6 of the output side optical fiber 4 in the combiner 2 and the end surface of the core 10 on the input end side of the optical fiber for connection of both ends 7 are spliced to each other without the axes being displaced so as to be coupled and connected to each other. The end surface of the core 10 of the input end 5 of the input side optical fibers 3 in the combiner 2 and the end surface of the core 10 on the output end side of the optical fiber for connection of both ends 7 are spliced to each other without the axes being displaced so as to be coupled and connected to each other.

An entrance optical fiber 13 is coupled to the input end 5 of one of the input side optical fibers 3 which is not connected to the optical fiber for connection of both ends 7. The core 10 of the entrance optical fiber 13 is configured such that it is coupled and connected to the end surface of the core 10 of the input end 5 of the input side optical fiber 3 which is not connected to the optical fiber for connection of both ends 7 without the axes being displaced, such that the entrance light 8 is made to enter the input side optical fiber 3. In the loop-shaped optical fiber 1, the entrance light 8 from the entrance optical fiber 13 enters the combiner 2 from the input end 5 of the input side optical fiber 3, and at least part of the entrance light 8 is passed through the output end 6 and the optical fiber for connection of both ends 7 in this order and enters again the combiner 2 from the input end 5 of the input side optical fiber 3 which is connected to the optical fiber for connection of both ends 7.

The optical fiber for connection of both ends 7 of the loop-shaped optical fiber 1 includes a light leakage means which is formed such that while the entrance light 8 entering the combiner 2 is being circulated in the loop-shaped optical fiber 1, the entrance light 8 leaks from the inside of the optical fiber for connection of both ends 7 to the outside of the optical fiber for connection of both ends 7. A range indicated by a line with arrows at both ends 9 indicates a range in which the light leakage means is provided in the optical fiber for connection of both ends 7. Hence, the optical fiber for connection of both ends 7 is formed such that the entrance light 8 entering the combiner 2 leaks to the outside of the optical fiber for connection of both ends 7 in the range 9. The range 9 indicated in the present embodiment is placed over the total length of the optical fiber for connection of both ends 7.

The optical fiber for connection of both ends 7 indicated in the present embodiment includes a cladding 11 on the outer circumference of the core 10, but so as not to hinder leaking of the light propagated through the cladding to the outside of the cladding at least over the range 9, protective coating which is normally formed on the outer side of the cladding in order to protect the optical fiber is peeled off or is not formed from the beginning. In order to facilitate the leaking of the light from the cladding 11, cladding light removal processing such as rough surface processing for providing a slightly rough state or forming of a fine pattern may be performed on the front surface of the cladding 11.

The light leakage means is configured such that at least one of the values among a numerical aperture (NA), a core diameter and a mode field diameter of the optical fiber for connection of both ends 7 is gradually reduced from the side of the optical fiber for connection of both ends 7 which is connected to the output end 6 of the output side optical fiber 4 toward the side which is connected to the input end 5 of the input side optical fiber 3. For example, in a case where the optical fiber for connection of both ends 7 is machined such that the core diameter of the optical fiber for connection of both ends 7 is gradually reduced from 100 μm to 50 μm from the side which is connected to the output end 6 of the output side optical fiber 4 toward the side which is connected to the input end 5 of the input side optical fiber 3, when the light is made to enter the optical fiber for connection of both ends 7 from the side on which the core diameter is 100 μm with the fiber NA, as the core diameter is decreased, part of the light leaks from the core 10 of the optical fiber for connection of both ends 7. Until the light reaches a position in which the core diameter is 50 μm, 50% of the entering light leaks from the core 10 at the maximum. When the configuration is one where the light easily leaks from the interior of the cladding 11 like the optical fiber for connection of both ends 7 of the present embodiment, the light which leaks from the core 10 to the cladding 11 further leaks from the cladding 11 to the outside of the optical fiber for connection of both ends 7.

The mode field diameter is adjusted by the core diameter and the refractive indexes of the core 10 and the cladding 11. In a single mode optical fiber having a small core diameter, the mode field diameter is larger than the core diameter, whereas in a multimode optical fiber having a large core diameter, the mode field diameter is substantially equal to the core diameter. The numerical aperture of the optical fiber for connection of both ends 7 is adjusted by the adjustment of the refractive indexes of the core 10 and the cladding 11 in the optical fiber for connection of both ends 7.

The optical fiber for connection of both ends 7 is produced such that at least one of the values among the numerical aperture, the core diameter and the mode field diameter is gradually reduced continuously, for example, substantially at a constant rate over the total length of the optical fiber for connection of both ends 7. In this way, the light propagated through the optical fiber for connection of both ends 7 can be made to leak from the inside of the optical fiber for connection of both ends 7 to the outside of the optical fiber for connection of both ends 7 substantially uniformly over the total length of the optical fiber for connection of both ends 7.

However, the light leakage means is not limited to the condition in which the light propagated through the optical fiber for connection of both ends 7 is reduced substantially at a constant rate over the total length of the optical fiber for connection of both ends 7. In order to satisfy the specification that the light propagated through the optical fiber for connection of both ends 7 leaks to the outside of the optical fiber for connection of both ends 7 substantially uniformly over the total length of the optical fiber for connection of both ends 7 there is a need to produce the optical fiber for connection of both ends 7 while performing control in such a manner as to gradually reduce at least one of the values among the numerical aperture, the core diameter and the mode field diameter of the optical fiber for connection of both ends 7 continuously over the total length of the optical fiber for connection of both ends 7. Although the light leakage means is preferably formed such that at least one of the values among the numerical aperture, the core diameter and the mode field diameter of the optical fiber for connection of both ends 7 is gradually reduced, the light leakage means is most preferably formed such that all of these values are gradually reduced.

The light which is returned to the input end 5 of the input side optical fiber 3 connected to the optical fiber for connection of both ends 7 without leaking from the optical fiber for connection of both ends 7 is joined to (combined with) the entrance light 8 entering from the input end 5 of the input side optical fiber 3 which is not connected to the optical fiber for connection of both ends 7 so as to be propagated again from the output end 6 of the output side optical fiber 4 in the optical fiber for connection of both ends 7. In this way, the entrance light 8 entering from the input end 5 of the input side optical fiber 3 which is not connected to the optical fiber for connection of both ends 7 is circulated within the loop-shaped optical fiber 1. Hence, when the loop-shaped optical fiber 1 does not include a light extraction means nor a light branch means for extracting from the loop-shaped optical fiber 1 the light propagated within the loop-shaped optical fiber 1 except for the light leakage means described above, the effect that substantially all the entrance light 8 entering the loop-shaped optical fiber 1 can leak from the inside of the optical fiber for connection of both ends 7 to the outside of the optical fiber for connection of both ends 7 substantially uniformly in the length direction of the optical fiber for connection of both ends 7 while the entrance light 8 entering the loop-shaped optical fiber 1 is being circulated in the loop-shaped optical fiber 1 becomes even more remarkable. In other words, the loop-shaped optical fiber 1 which does not include the light extraction means and the light branch means can more remarkably obtain the effect in which substantially all the entrance light 8 can leak from the optical fiber for connection of both ends 7 to the outside substantially uniformly over the total length of the optical fiber for connection of both ends 7.

The combiner 2 may satisfy a relationship of (diameter of the entire branch of the input side optical fibers)×(numerical aperture of the input side optical fibers)≤(core diameter of the output side optical fiber)×(numerical aperture of the output side optical fiber). Since the entrance light 8 entering from an entrance end is propagated according to "the conservation law of luminance" in which a product of the fiber diameter of the input side optical fiber 3 and the numerical aperture of the entrance light 8 is constant, in the fiber taper portion 12 of the combiner 2, the numerical aperture of the entrance light 8 is increased inversely proportional to a decrease in the fiber diameter. However, as long as the relationship described above is satisfied, on condition that only a small loss is caused, the combiner 2 can be machined to have a tapered shape, and thus it is possible to decrease a light loss in the combiner 2.

Here, in the loop-shaped optical fiber 1, when the numerical aperture, the core diameter and the mode field diameter of the output side optical fiber 4 in a position in which the output side optical fiber 4 and the optical fiber for connection of both ends 7 are connected together are respectively represented as $NA_1$, $D_1$ and $MFD_1$, and the numerical aperture, the core diameter and the mode field diameter of the optical fiber for connection of both ends 7 in the position in which the output side optical fiber 4 and the optical fiber for connection of both ends 7 are connected together are respectively represented as $NA_2$, $D_2$ and $MFD_2$, three relational formulas $NA_1 \leq NA_2$, $D_1 \leq D_2$ and $MFD_1 \leq MFD_2$ are designated as a first relational formula group. On the other hand, in the loop-shaped optical fiber 1, when the numerical aperture, the core diameter and the mode field diameter of the optical fiber for connection of both ends 7 in a position in which the optical fiber for connection of both ends 7 and the input side optical fiber 3 are connected together are respectively represented as $NA_3$, $D_3$ and $MFD_3$, and the numerical aperture, the core diameter and the mode field diameter of the input side optical fiber 3 in the position in which the optical fiber for connection of both ends and the input side optical fiber 3 are connected together are respectively represented as $NA_4$, $D_4$ and $MFD_4$, three relational formulas $NA_3 \leq NA_4$, $D_3 \leq D_4$ and $MFD_3 \leq MFD_4$ are designated as a second relational formula group. Here, the loop-shaped optical fiber 1 is preferably configured such that all the relational formulas included in the first and second relational formula groups hold true. In this way, it is possible to decrease a connection loss at a splice at which the output side optical fiber 4 and the optical fiber for connection of both ends 7 are connected together as well as a connection loss at a splice at which the optical fiber for connection of both ends 7 and the input side optical fibers 3 are connected together.

Here, all of $NA_1$ to $NA_4$ described above are used to mean the numerical apertures (NA) of the fibers which are determined from the refractive indexes of the cores and the claddings in the individual optical fibers, and are not a numerical aperture (NA) which represents an entrance angle condition in which light entering from the core of the end surface of each optical fiber is totally reflected within the core, is propagated and can reach the other end surface of the optical fiber. As described above, by reducing both an optical coupling loss in the combiner 2 and the connection loss at the splice of the optical fiber in the loop-shaped optical fiber 1, substantially all the entrance light 8 entering the loop-shaped optical fiber 1 from the entrance optical fiber 13 can be made to leak from the inside of the optical fiber for connection of both ends 7 to the outside of the optical fiber for connection of both ends 7 substantially uniformly over the total length of the optical fiber for connection of both ends 7.

With respect to the cladding diameter, it is preferable that, in the position in which the output side optical fiber 4 and the optical fiber for connection of both ends 7 are connected together and in the position in which the optical fiber for connection of both ends 7 and the input side optical fiber 3 are connected together, the cladding diameters of the optical fiber on the upstream side and the optical fiber on the downstream side in the direction of propagation of the light are substantially equal, and at least the cladding diameter of the optical fiber on the upstream side is not larger than that of the optical fiber on the downstream side.

When in the combiner 2, a plurality of input side optical fibers 3 are coupled to the output side optical fiber 4 so as to satisfy the relationships described above, the numerical aperture and the core diameter of the output side optical fiber 4 are inevitably larger than the numerical aperture and the core diameter of the input side optical fibers 3. At the splice of the optical fiber, when the light is propagated from the side of the optical fiber whose numerical aperture and core diameter are larger to the side of the optical fiber whose numerical aperture and core diameter are relatively smaller, the connection loss increases. Furthermore, as described above, in the optical fiber which is machined such that the numerical aperture and the core diameter of the optical fiber are gradually decreased, part of the light propagated cannot be left within the core so as to leak from the core. In the present invention, the relationships described previously which can be said to be restrictions on the configuration of the optical fiber parts are utilized conversely, and thus the optical fiber for connection of both ends 7 is produced such that the numerical aperture and the core diameter of the optical fiber for connection of both ends 7 are gradually decreased from values which are at least equal to or larger than the numerical aperture and the core diameter of the output side optical fiber 4 to values which are at least equal to or smaller than the numerical aperture and the core diameter of the input side optical fiber 3. In this way, the optical coupling loss in the combiner 2 and the connection loss at the splice are minimized, and thus substantially all the entrance light 8 entering the loop-shaped optical fiber 1 from the entrance optical fiber 13 can leak from the inside of the optical fiber for connection of both ends 7 to the outside of the optical fiber for connection of both ends 7 substantially uniformly over the total length of the optical fiber for connection of both ends 7.

Second Embodiment

Figure 2:
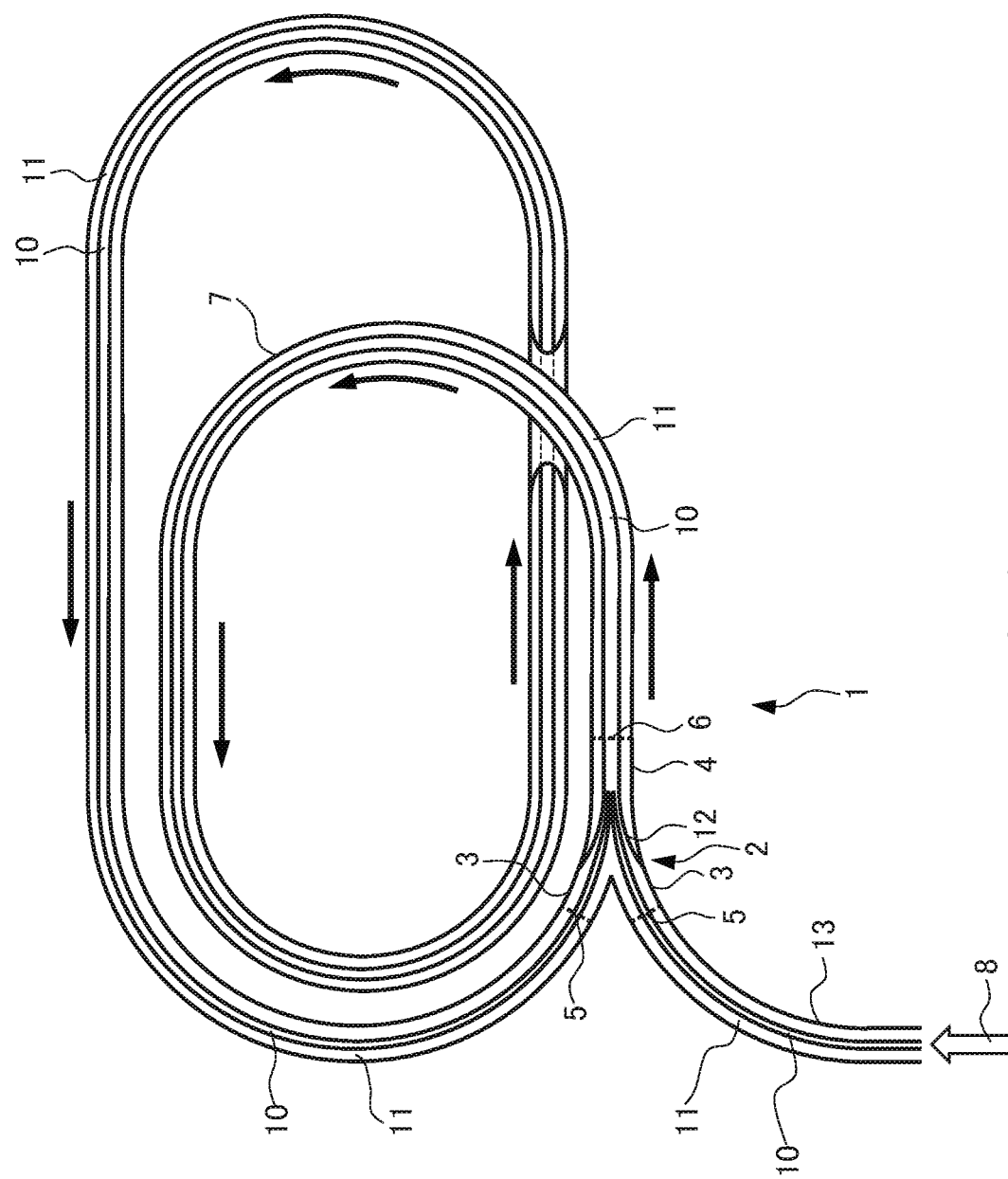
FIG. 2 is a schematic view of a loop-shaped optical fiber which is used in a fiber laser oscillator of a fiber laser apparatus according to a second embodiment of the present invention.

FIG. 2 is a schematic view of a loop-shaped optical fiber which is used in a fiber laser oscillator of a fiber laser apparatus according to a second embodiment of the present invention. In FIG. 2, the optical fiber part is shown by a schematic cross-sectional view in which a plane including the center line of the optical fiber is the cross section, except for a part where a plurality of optical fibers appears to intersect each other. As in FIG. 1, the fiber laser apparatus and the fiber laser oscillator are omitted. As shown in FIG. 2, the loop of the loop-shaped optical fiber 1 is not limited to a single loop, and loops may be wound any number of times. In the present embodiment, a structure in which loops are wound twice is illustrated. Although in FIG. 2, the core diameter of the optical fiber for connection of both ends 7 is not drawn so as to be uniformly varied along the length direction of the optical fiber, it should be understood that FIG. 2 is only a schematic view. The same is true in other drawings.

In FIG. 2, for ease of understanding of the configuration of the loop-shaped optical fiber 1, the diameters of the loops are changed between the first loop and the second loop such that the positions of the loops are displaced. However, it is needless to say that, in the installation, the diameters of a plurality of loops may be substantially equal such that the loops are overlaid on each other. When FIG. 2 is seen from the front surface, in the part in which the first loop appears to intersect the second loop, the loop whose loop diameter is large is arranged on the back side of the illustrated plane as compared with the loop whose loop diameter is small, thereby schematically showing a state of three-dimensional intersection. As in the present embodiment, the loops of the loop-shaped optical fiber 1 are wound a plurality of times, and thus when a predetermined length is needed for the optical fiber of the loop-shaped optical fiber 1, the loop-shaped optical fiber 1 can be installed within the fiber laser apparatus so as to be compact.

Third Embodiment

Figure 3A:
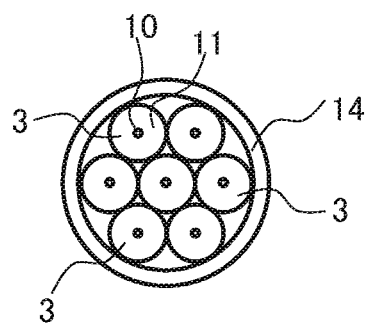
FIG. 3A is a schematic cross-sectional view which is perpendicular to the center line of an optical fiber in a position where 7 input side optical fibers of a combiner are bundled in a loop-shaped optical fiber used in a fiber laser oscillator of a fiber laser apparatus according to a third embodiment of the present invention.
Figure 3B:
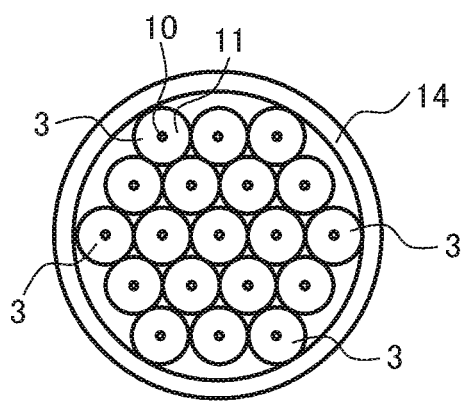
FIG. 3B is a schematic cross-sectional view which is perpendicular to the center line of an optical fiber in a position where 19 input side optical fibers of the combiner are bundled in the loop-shaped optical fiber used in the fiber laser oscillator of the fiber laser apparatus according to the third embodiment of the present invention.

FIGS. 3A and 3B are schematic cross-sectional views which are perpendicular to the center line of an optical fiber in a position where the input side optical fibers of a combiner are bundled in a loop-shaped optical fiber used in a fiber laser oscillator of a fiber laser apparatus according to a third embodiment of the present invention. As shown in FIGS. 3A and 3B, when a plurality of input side optical fibers 3 are bundled in a hexagonal close-packed structure, if the number of input side optical fibers 3 in the combiner is set such that the cross-sectional outer shape of the bundle is close to a circle, it becomes easy to produce the fiber taper portion 12 of the combiner 2 shown in FIGS. 1 and 2.

The specific number thereof is equal to or more than 7 as shown in FIG. 3A. For example, as shown in FIG. 3B, the specific number thereof can be set to 19. As a larger number thereof, 37 or 61 is illustrated. The bundle of the input side optical fibers 3 is sealed with an over-cladding tube 14. In a case where the number of input side optical fibers is set to the numbers described above, when the number of input side optical fibers is more than necessary, unnecessary input side optical fibers may be set to dummy fibers which are not utilized. The dummy fiber does not need to have an optical fiber structure formed of a core and a cladding and may be a fiber which has a simple structure free of a core.

Figure 3C:
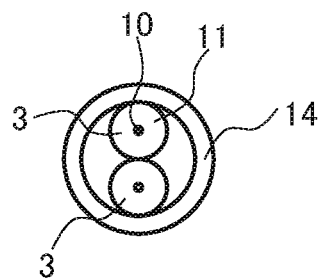
FIG. 3C is a schematic cross-sectional view which is perpendicular to the center line of an optical fiber in a position where the input side optical fibers of the combiner are bundled in the loop-shaped optical fiber when two input side optical fibers are effective.
Figure 3D:
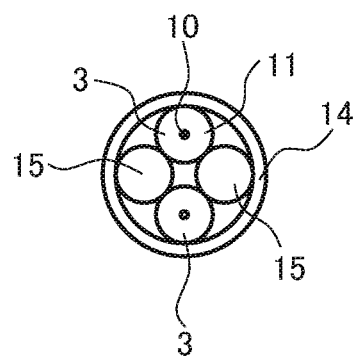
FIG. 3D is a schematic cross-sectional view which is perpendicular to the center line of an optical fiber in a position where the input side optical fibers of the combiner are bundled in the loop-shaped optical fiber when two input side optical fibers are effective and two dummy fibers are provided.

As shown in FIGS. 1 and 2, FIG. 3C shows a state where two input side optical fibers 3, 3 are bundled. FIG. 3D shows a state where four input side optical fibers 3 are bundled. As in FIGS. 1 and 2, the two input side optical fibers 3, 3 among the four input side optical fibers are optical fibers which light enters but the other two optical fibers are the dummy fibers 15, 15 described above which light does not enter. An area between the optical fibers within the over-cladding tube 14 and gaps between the over-cladding tube 14 and the optical fibers disappear when the over-cladding tube 14 is narrowed down so as to have a tapered shape until the outside diameter of the over-cladding tube 14 within which the bundle of the optical fibers is stored is equal to, for example, the outside diameter of the output side optical fiber 4 in the combiner 2 shown in FIGS. 1 and 2.

Fourth Embodiment

Figure 4:
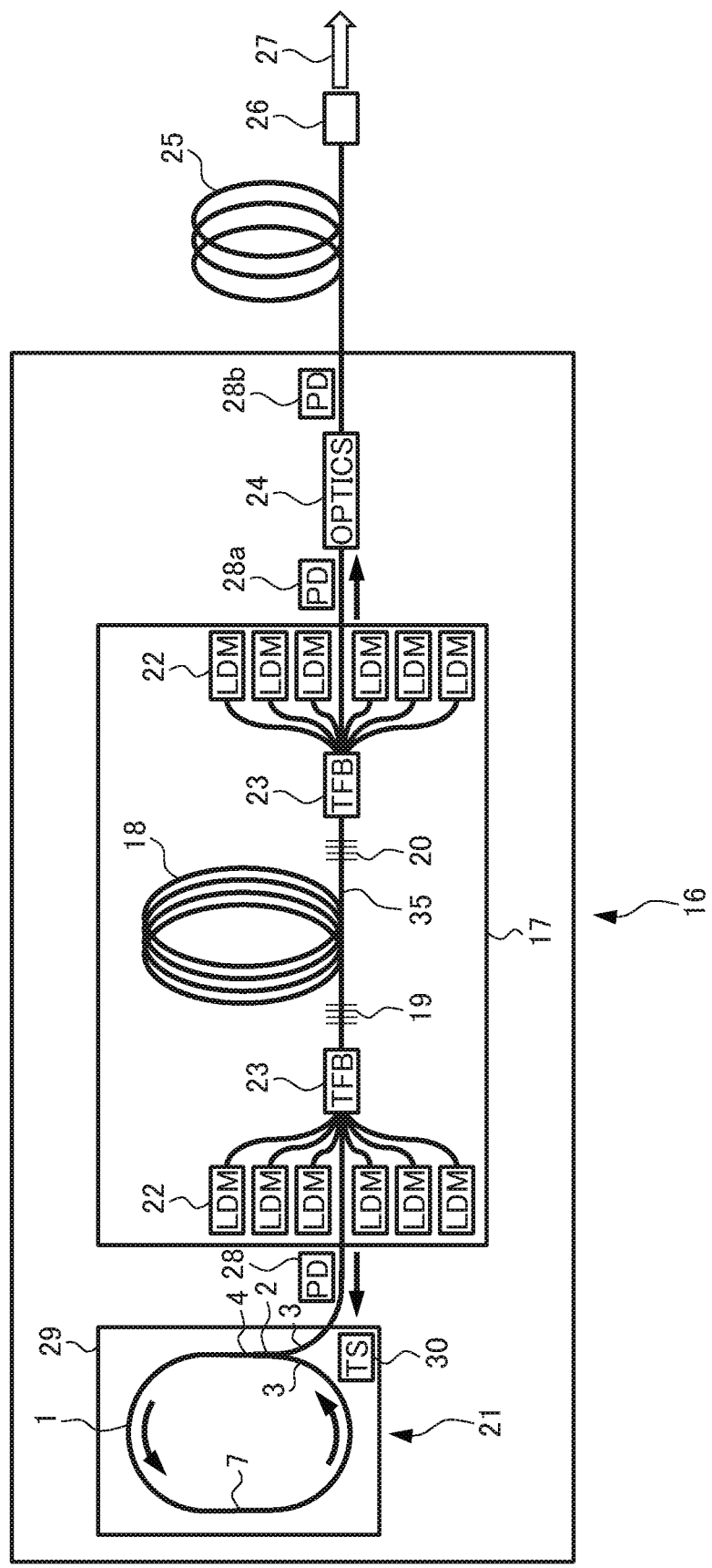
FIG. 4 is a schematic view showing the configuration of a fiber laser apparatus according to a fourth embodiment of the present invention.

FIG. 4 is a schematic view of a fiber laser oscillator in a fiber laser apparatus according to a fourth embodiment of the present invention and a main portion of a related optical system. In FIG. 4, a loop-shaped optical fiber 1 is applied to a return light elimination module 21 for eliminating return light which is passed from the signal light optical fiber 35 of the fiber laser oscillator 17 in the fiber laser apparatus 16 through a high-reflecting fiber Bragg grating (HRFBG) 19. In FIG. 4, for simplification of the drawing, the optical fibers are indicated by thick solid lines without the detailed structure thereof such as a core and a cladding being shown.

In the fiber laser oscillator 17 of the present embodiment, excitation light emitted from a plurality of laser diode modules (LDM) 22 is injected through a tapered fiber bundle (TFB) 23 into the internal cladding of the double cladding fiber of an amplification optical fiber 18, and while the excitation light is being propagated, the excitation light is gradually absorbed into a core to which rare earth ions are doped. The illustration of a laser power supply unit for driving the LDM 22 and a control unit for controlling the individual portions of the fiber laser apparatus 16 is omitted. Output laser light 27 from the fiber laser oscillator 17 is emitted from a machining head 26 through a laser optical system 24 such as a fiber coupler and a delivery fiber 25. The fiber laser apparatus 16 utilizes the loop-shaped optical fiber 1 in order to eliminate, in the return light elimination module 21, the return light that is passed through the HRFBG 19, such as reflected light in which part of the emitted laser light is reflected off the front surface of a target to be machined and is propagated in a direction opposite to the output laser light 27 and Stokes light which is generated in the process of propagation through the optical fibers and whose wavelength is longer than that of laser light oscillated by the fiber laser oscillator 17. The entrance optical fiber 13 of the loop-shaped optical fiber 1 is connected through the TFB 23 to the signal light optical fiber 35.

Figure 5A:
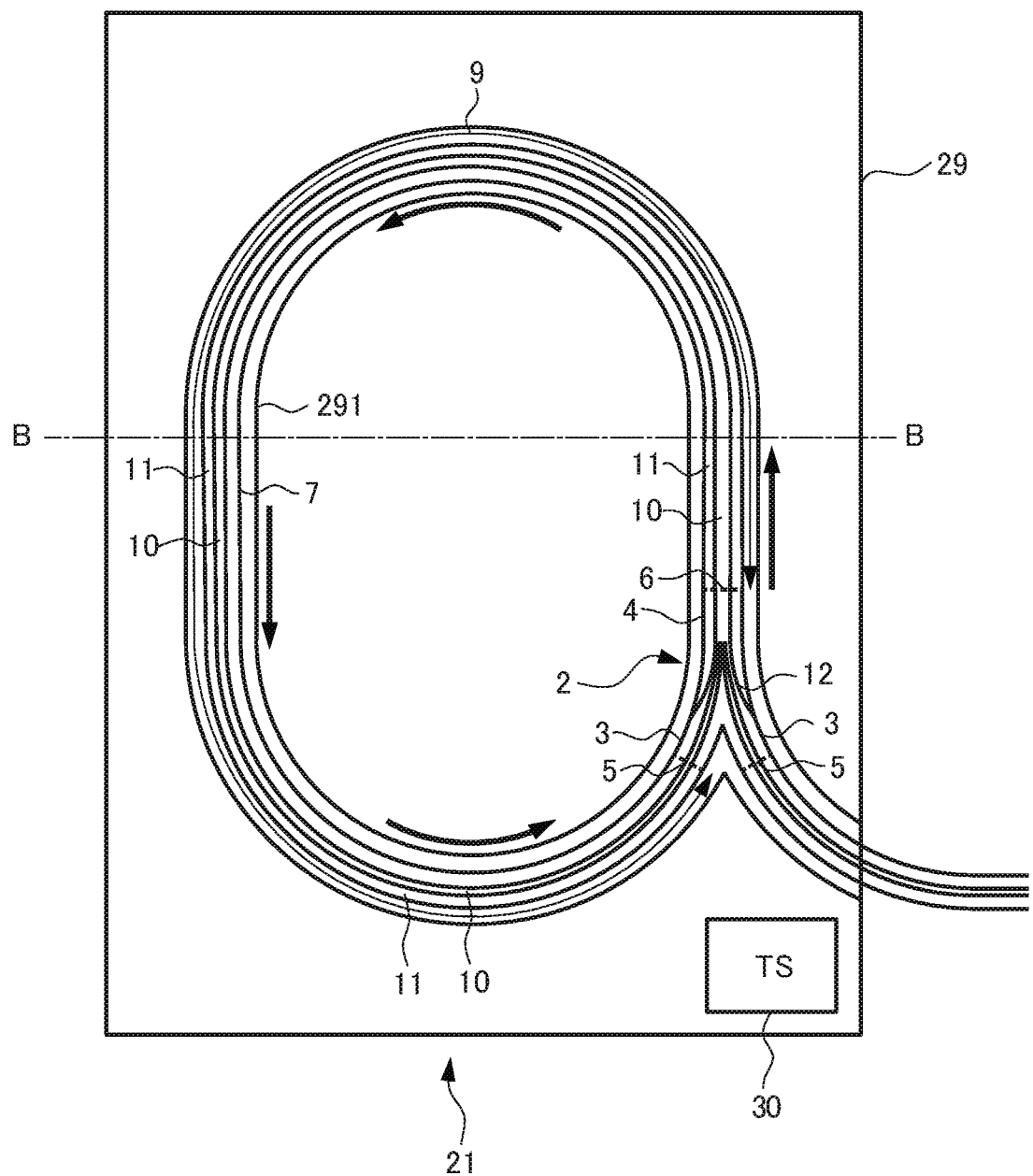
FIG. 5A is a schematic view showing the configuration of a return light elimination module of the fiber laser apparatus according to the fourth embodiment of the present invention.
Figure 5B:
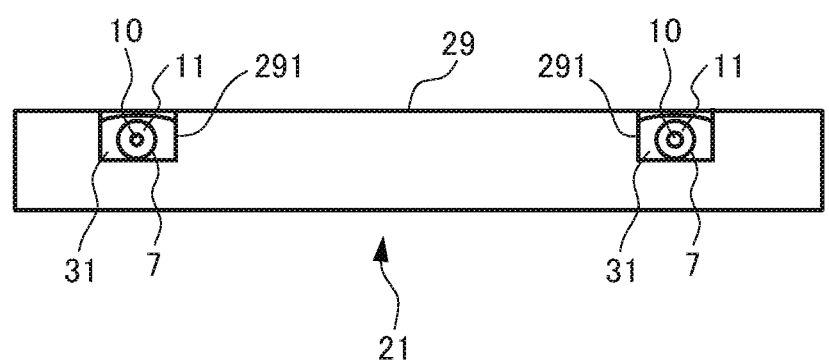
FIG. 5B is a schematic cross-sectional view taken along line B-B in FIG. 5A.

FIG. 5A is a detailed schematic view of the return light elimination module in the fiber laser apparatus of the present embodiment. In FIG. 5A, the optical fiber part is shown by a conceptual schematic view in which a plane including the center line of the optical fiber is the cross section. FIG. 5B is a schematic cross-sectional view taken along line B-B in FIG. 5A. While the return light entering the loop-shaped optical fiber 1 is being circulated in the loop-shaped optical fiber 1, the light propagated through the optical fiber for connection of both ends 7 leaks from the optical fiber for connection of both ends 7 substantially uniformly in the length direction of the optical fiber for connection of both ends 7 in a leakage range 9 from the inside of the optical fiber for connection of both ends 7 to the outside of the optical fiber for connection of both ends 7. The loop-shaped optical fiber 1 in the return light elimination module 21 is stored in a groove 291 which is formed in one surface of a thermal conductive member 29 such as an aluminum plate. The loop-shaped optical fiber 1 within the groove 291 is thermally connected to the thermal conductive member 29 with a thermally conductive fixing material 31 such as a thermal conductive compound or a thermal conductive adhesive so as to be fixed. The return light which leaks from the optical fiber for connection of both ends 7 substantially uniformly in the length direction of the optical fiber for connection of both ends 7 is converted into heat, and the heat is passed through the thermal conductive member 29 and is dissipated with a heat dissipation means (unillustrated) such as a water-cooled plate which is thermally connected to the thermal conductive member 29.

In this way, the return light such as the reflected light reflected off the target to be machined and the like which is passed through the HRFBG 19 to enter the return light elimination module 21, which may damage the fiber laser oscillator 17 and the like and the Stokes light (scattered light) caused by nonlinear induced scattering such as Raman scattering that restricts the output of the fiber laser oscillator 17 can be completely eliminated in the return light elimination module 21, and the return light can be completely prevented from returning again to the fiber laser oscillator 17.

Further, since the elimination of the return light, that is, the leakage of the return light from the optical fiber for connection of both ends 7 is not performed locally, the light entering the optical fiber for connection of both ends 7 leaks in the leakage range 9 from the inside of the optical fiber for connection of both ends 7 to the outside of the optical fiber for connection of both ends 7, that is, substantially over the total length of the optical fiber for connection of both ends 7 substantially uniformly in the length direction of the optical fiber for connection of both ends 7, it is possible to prevent the occurrence of a failure such as a damage of the loop-shaped optical fiber 1 or the return light elimination module 21 caused by a local temperature rise in part of the loop-shaped optical fiber 1. Moreover, due to the structure, it is possible to completely remove the reflection of the return light off the return light elimination module 21.

Furthermore, since at least part of the loop-shaped optical fiber 1 is thermally connected to the thermal conductive member 29, it is possible to reduce a risk that the temperature of the loop-shaped optical fiber 1 is increased by the return light which leaks from the loop-shaped optical fiber 1 so as to damage the loop-shaped optical fiber 1.

At least in the leakage range 9 in which the return light leaks from the optical fiber for connection of both ends 7 substantially uniformly in the length direction of the optical fiber for connection of both ends 7, the protective coating which is normally placed on the outer side of the cladding to surround the optical fiber in order to protect the optical fiber is preferably peeled off as in the optical fiber for connection of both ends 7 of the present embodiment. As described previously, the cladding light removal processing may be performed on the front surface of the cladding 11 of the optical fiber for connection of both ends 7 so that the return light may easily leak. As shown in FIG. 4, a light detection means 28 which detects the amount of light that leaks from the signal light optical fiber 35 between the return light elimination module 21 and the HRFBG 19 may be provided so as to monitor the amount of return light which enters the return light elimination module 21. As the light detection means 28, a photodiode is used, and thus the amount of reflected light can be detected quickly, and feedback to a light output command issued by the control unit of the fiber laser apparatus 16 can be performed quickly. As shown in FIG. 4, a plurality of similar light detection means such as a light detection means 28a which mainly detects the output laser light 27 and a light detection means 28b which mainly detects the return light may be installed, for example, in front of and behind the laser optical system 24. In order to monitor the temperature of the thermal conductive member 29, a temperature sensor 30 may be provided.

Fifth Embodiment

Figure 6:
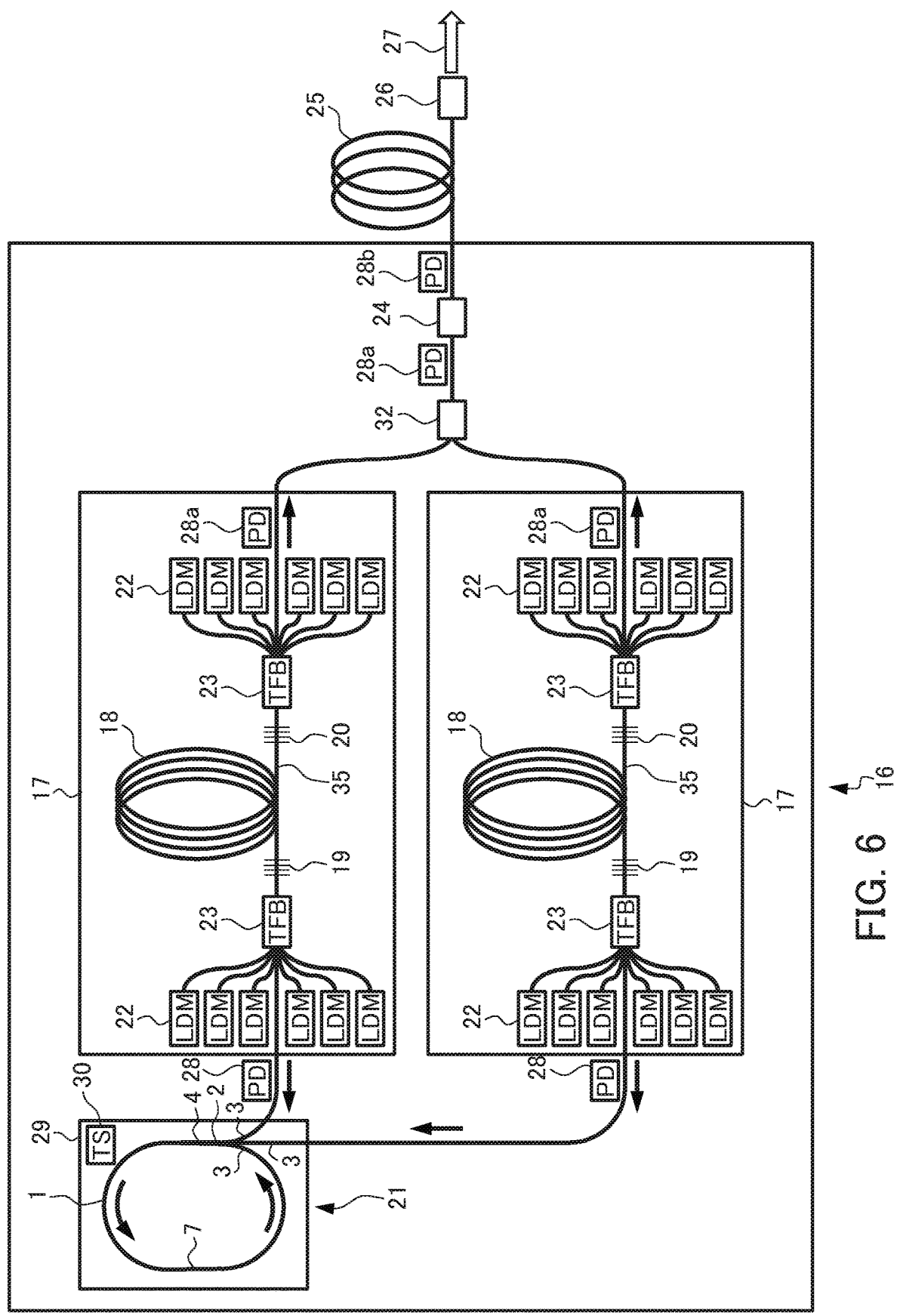
FIG. 6 is a schematic view showing the configuration of a fiber laser apparatus according to a fifth embodiment of the present invention.

FIG. 6 is a schematic view showing the configuration of a fiber laser apparatus according to a fifth embodiment of the present invention. Even in FIG. 6, for simplification of the drawing, the optical fibers are indicated by thick solid lines without the detailed structure thereof such as a core and a cladding being shown. The fiber laser apparatus 16 indicated in the present embodiment has a structure for eliminating return light from two fiber laser oscillators 17, 17 with one return light elimination module 21 at once. Hence, the number of input side optical fibers 3 of a combiner 2 in a loop-shaped optical fiber 1 is three. Laser light emitted from the two fiber laser oscillators 17, 17 is combined in an output laser light combination combiner 32 and is emitted from the fiber laser apparatus 16. In the structure of the present embodiment in which the return light from a plurality of fiber laser oscillators 17, 17 is eliminated with one return light elimination module 21 at once, the number of fiber laser oscillators 17 is not limited to two. By eliminating the return light from a plurality of fiber laser oscillators 17 is eliminated with one return light elimination module 21 at once, it is possible to reduce the cost.

Sixth Embodiment

Figure 7:
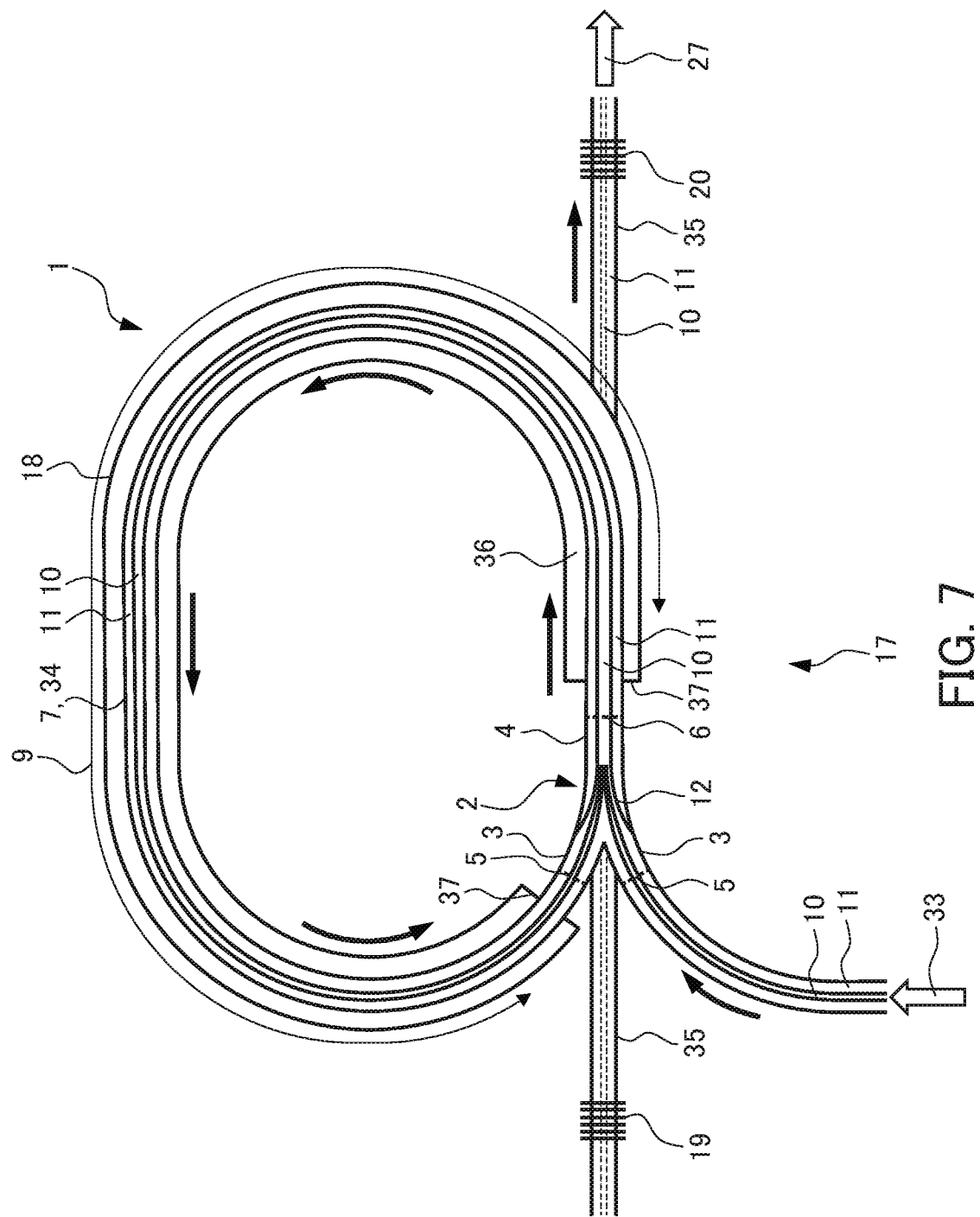
FIG. 7 is a schematic view showing the configuration of a fiber laser oscillator in a fiber laser apparatus according to a sixth embodiment of the present invention.
Figure 8:
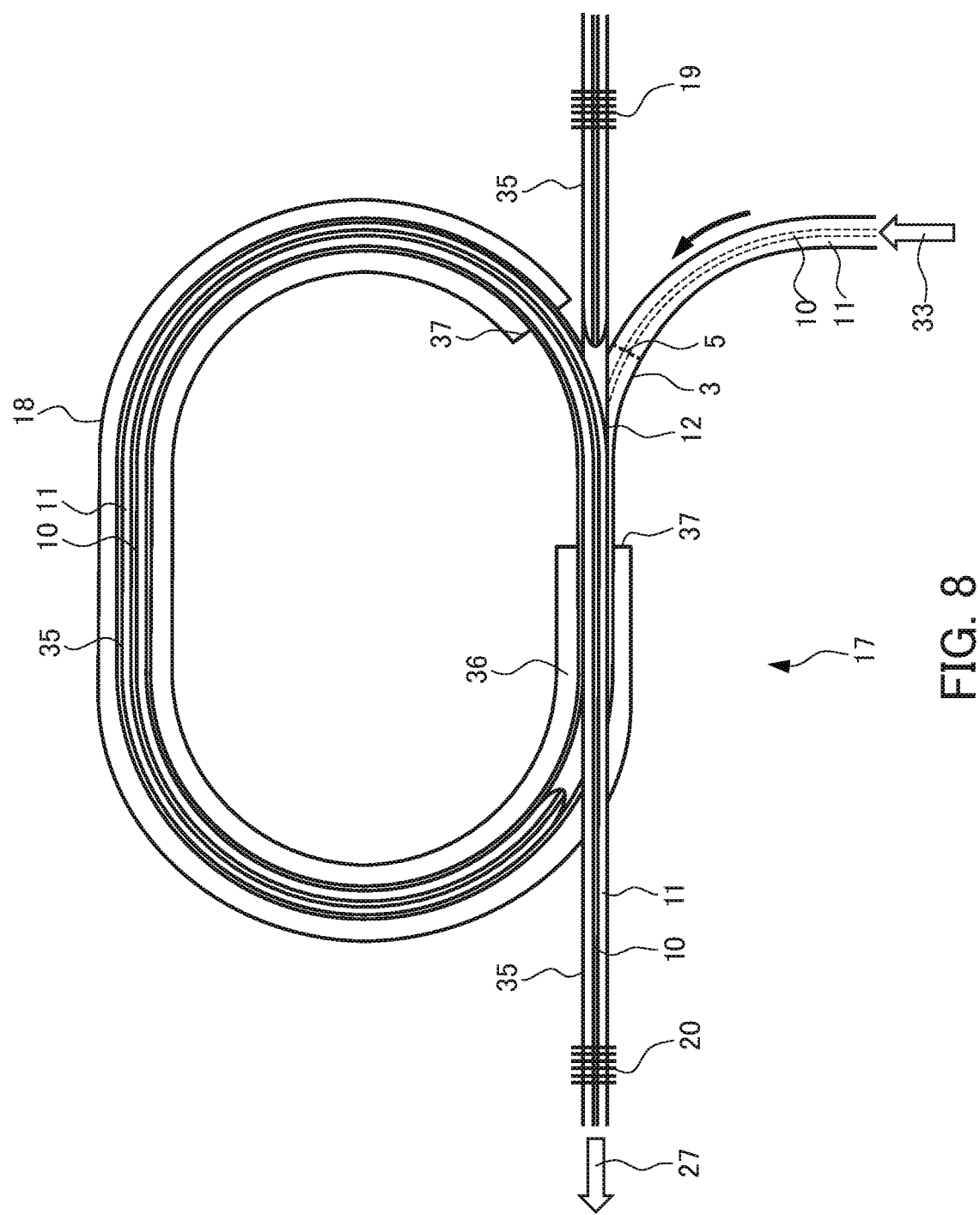
FIG. 8 is a schematic view when the fiber laser oscillator of the fiber laser apparatus according to the sixth embodiment of the present invention is seen from a side opposite to FIG. 7.

FIGS. 7 and 8 are schematic views showing the configuration of a fiber laser oscillator in a fiber laser apparatus according to a sixth embodiment of the present invention. However, laser diode modules are omitted so as not to be illustrated. Excitation light 33 from the laser diode modules 22 is combined with a tapered fiber bundle 23 as shown in FIGS. 4 and 6, and is then made to enter the input side optical fiber 3 of a combiner 2. In the present embodiment, a loop-shaped optical fiber 1 is applied to an excitation light optical fiber for side pumping 34 which is adjacent to the signal light optical fiber 35 of the fiber laser oscillator 17 and which is extended parallel thereto. The excitation light optical fiber 34 which is described in any of the embodiments are all the excitation light optical fiber for side pumping.

FIG. 7 shows a schematic cross-sectional view where a plane including the center line of the excitation light optical fiber 34 to which the loop-shaped optical fiber 1 is applied is the cross section. In FIG. 7, the signal light optical fiber 35 in the part of an amplification optical fiber 18 is arranged on the back side of the excitation light optical fiber 34 so as not to be seen. On the other hand, FIG. 8 is a schematic cross-sectional view seen from the back side of FIG. 7, and shows a schematic cross-sectional view in which a plane including the center line of the signal light optical fiber is the cross section. However, the part which the signal light optical fiber 35 intersects is shown by a schematic cross-sectional view in which a plane including the center line of the signal light optical fiber 35 in front of the illustrated plane is the cross section.

A large proportion of the excitation light optical fiber 34 and the signal light optical fiber 35 which are arranged adjacent so as to be extended parallel to each other is covered with a sleeve 36. The sleeve 36 includes the excitation light optical fiber 34 and the signal light optical fiber 35 such that the excitation light 33 leaking from the excitation light optical fiber 34 is highly efficiently absorbed into the signal light optical fiber 35, and is formed of a material such as a low refractive index polymer which has a refractive index lower than that of the cladding of the signal light optical fiber 35.

Figure 9A:
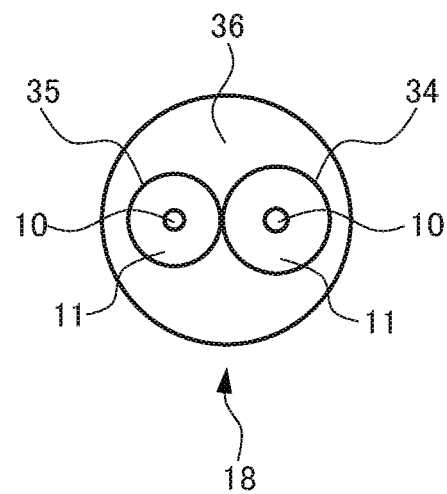
FIG. 9A is a schematic cross-sectional view of a side pumping structure in the fiber laser oscillator of the fiber laser apparatus according to the sixth embodiment of the present invention.

FIG. 9A is a schematic cross-sectional view of the amplification optical fiber 18 formed with the excitation light optical fiber 34 and the signal light optical fiber 35 which are covered with the sleeve 36, and is a schematic cross-sectional view of a side pumping structure. Although in the present embodiment, the diameter of the excitation light optical fiber 34 is drawn to be larger than that of the signal light optical fiber 35, the magnitude relationship between the diameters of the excitation light optical fiber 34 and the signal light optical fiber 35 is not limited to the relationship shown in the present embodiment. As described above, due to the fact that at least part of the excitation light optical fiber 34 and the signal light optical fiber 35 which are arranged adjacent so as to be extended parallel to each other is covered with the sleeve 36 which includes the excitation light optical fiber 34 and the signal light optical fiber 35 and which has a refractive index lower than the cladding 11 of the signal light optical fiber 35, the excitation light 33 which leaks from the excitation light optical fiber for side pumping 34 is highly efficiently absorbed into the signal light optical fiber 35.

When applying the loop-shaped optical fiber 1 to the excitation light optical fiber 34, in parts close to both ends of the optical fiber for connection of both ends 7 of the excitation light optical fiber 34, it is preferably that the numerical aperture and the core diameter are set constant, and the leakage range 9 in which the entered excitation light 33 leaks from the inside of the optical fiber for connection of both ends 7 to the outside of the optical fiber for connection of both ends 7, that is, a range in which the optical fiber for connection of both ends 7 includes the light leakage means is set shorter than the total length of the optical fiber for connection of both ends 7, with the result that the range is included in a range covered with the sleeve 36. By so doing, the excitation light 33 does not leak from the part which is not covered with the sleeve 36, and thus the excitation light 33 can be more highly efficiently absorbed into the signal light optical fiber 35. In order to prevent the excitation light 33 from leaking from the end surface 37 of the sleeve 36, a reflection coating may be applied to the front surface of the end surface 37 of the sleeve 36.

Although in FIGS. 7 and 8, for simplicity of the drawings, the loop-shaped optical fiber 1 has a single loop, as shown in FIG. 2, a plurality of loops can be provided. Hence, in this case, (range in which optical fiber for connection of both ends includes light leakage means)/(total length of optical fiber for connection of both ends) can be substantially set close to 1. Hence, the excitation light 33 which leaks from the inside of the excitation light optical fiber 34 to the outside of the excitation light optical fiber 34 substantially uniformly in the length direction of the excitation light optical fiber 34 is absorbed into the core 10 of the signal light optical fiber 35 which is extended parallel to the excitation light optical fiber 34. In this way, the amount of excitation light absorbed into the length direction of the amplification optical fiber 18 is made substantially uniform, and thus the heat generation rate and the temperature distribution in the length direction of the amplification optical fiber 18 can be made substantially uniform as well. Further, even without elongating the length of the fiber, since almost all of the excitation light 33 entering the loop-shaped optical fiber 1 leaks to the outside of the loop-shaped optical fiber 1 so as to be absorbed into the signal light optical fiber 35, while setting the amplification optical fiber 18 to have the most appropriate length as the laser oscillator, the ratio of the excitation light which does not contribute to the excitation can be reduced. Hence, it is possible to realize a high-power, highly-efficient fiber laser apparatus which is unlikely to reach the operational limit caused by an increase in the temperature of the amplification optical fiber 18 and the high-power operational limit caused the occurrence of non-linear induced scattering such as SRS and which is highly reliable.

Seventh Embodiment

Figure 9B:
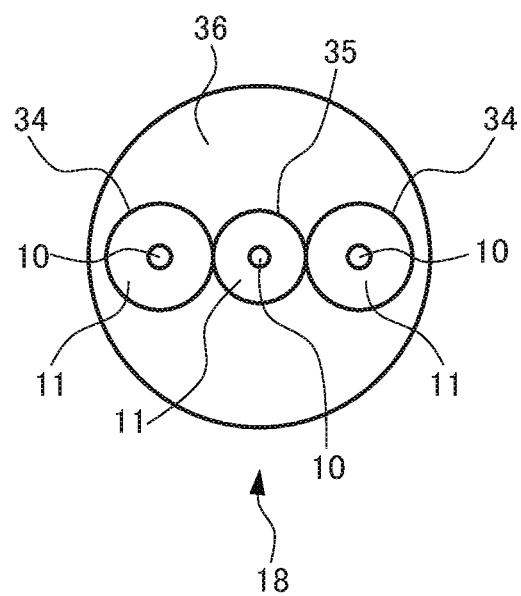
FIG. 9B is a schematic cross-sectional view of a side pumping structure in a fiber laser oscillator of a fiber laser apparatus according to a seventh embodiment of the present invention.

FIG. 9B is a schematic cross-sectional view of a side pumping in a fiber laser oscillator of a fiber laser apparatus according to a seventh embodiment of the present invention. In FIG. 9B, a plurality of (in the present embodiment, two) excitation light optical fibers 34, 34 are arranged adjacent to one signal light optical fiber 35. In the present embodiment, the direction in which excitation light 33 is propagated is the same both in the left and right excitation light optical fibers 34, 34. The schematic view of the fiber laser oscillator in the present embodiment is the same as that of the fiber laser oscillator 17 shown in FIG. 7. In the part of the amplification optical fiber 18, the signal light optical fiber 35 which is not seen is present behind the hithermost excitation light optical fiber 34, and further behind it, the excitation light optical fiber 34 which has the same shape as the hithermost excitation light optical fiber 34 and which is also not seen is present. By surrounding the signal light optical fiber 35 by a plurality of excitation light optical fibers 34, 34, a larger amount of excitation light per unit length of the amplification optical fiber 18 can be absorbed into the signal light optical fiber 35.

Eighth Embodiment

Figure 10:
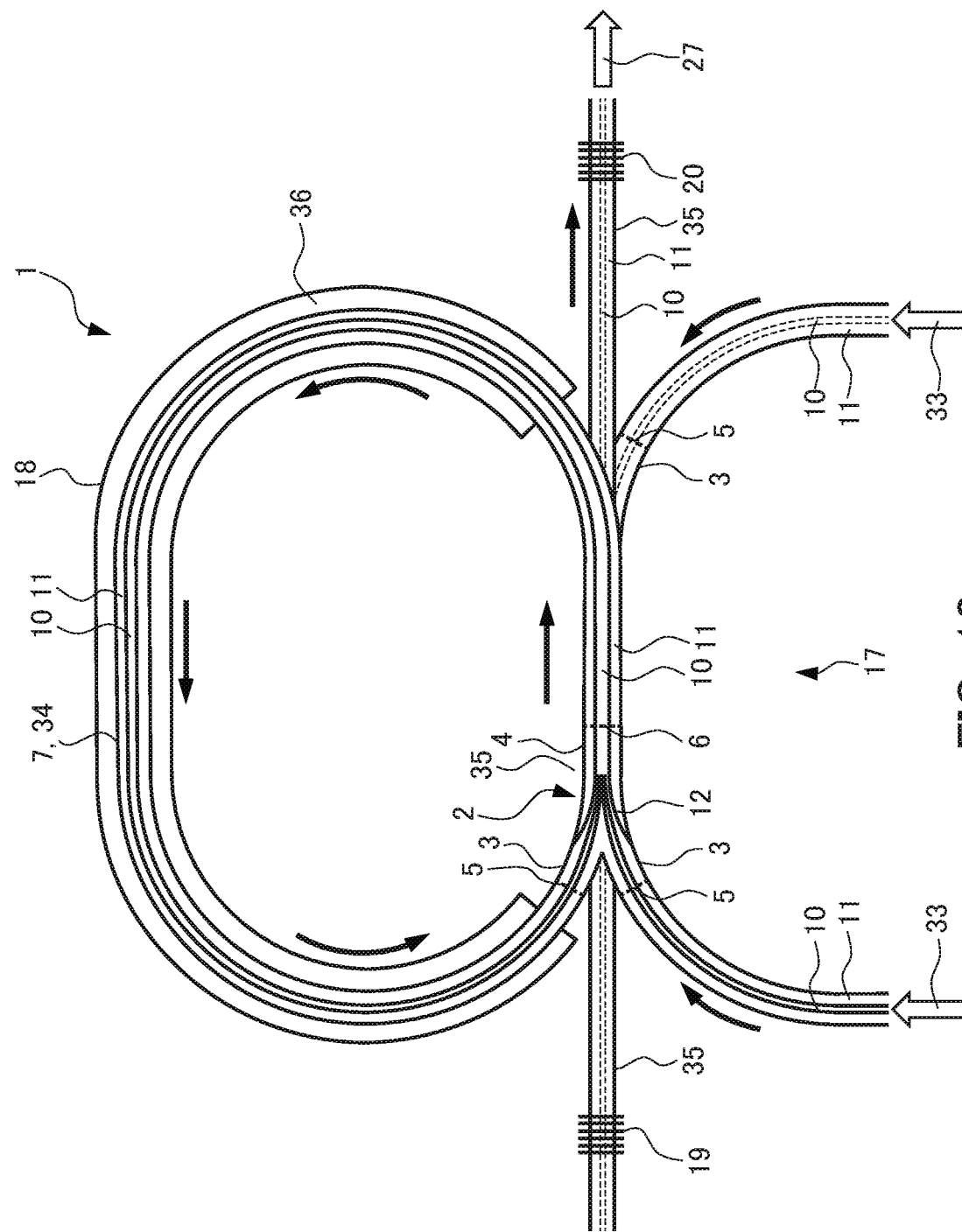
FIG. 10 is a schematic view showing the configuration of a fiber laser oscillator in a fiber laser apparatus according to an eighth embodiment of the present invention.

FIG. 10 is a schematic view showing the configuration of a fiber laser oscillator in a fiber laser apparatus according to an eighth embodiment of the present invention, and shows a schematic cross-sectional view where a plane including the center line of the hithermost excitation light optical fiber 34 to which a loop-shaped optical fiber 1 is applied is the cross section. In FIG. 10, in the part of the amplification optical fiber 18, a signal light optical fiber 35 is arranged behind the hithermost excitation light optical fiber 34, and further behind it, an excitation light optical fiber 34 in a state where the hithermost excitation light optical fiber 34 is turned inside out is arranged. Although the schematic cross-sectional view of a side pumping structure is the same as that in FIG. 9B, in the left and right excitation light optical fibers 34, 34, the directions in which the excitation light 33 is propagated are opposite to each other.

As in the present embodiment, by adopting a side pumping structure in which a plurality of excitation light optical fibers 34, 34 are arranged adjacent to one signal light optical fiber 35 and in which the direction in which the light is propagated within at least one excitation light optical fiber 34 among the excitation light optical fibers 34, 34 is opposite to the direction in which the light is propagated within the other excitation light optical fiber 34 arranged adjacent thereto, and by surrounding the signal light optical fiber 35 by a plurality of excitation light optical fibers for side pumping, a larger amount of excitation light can be absorbed into the signal light optical fiber 35. Since the excitation light 33 can be introduced both from the side of the HRFBG 19 of the signal light optical fiber 35 and from the side of an output coupler-fiber Bragg grating (OCFBG) 20 on the laser light output side, the number of excitation LDMs 22 can be increased, with the result that the output of the fiber laser oscillator 17 is increased.

Ninth Embodiment

Figure 11:
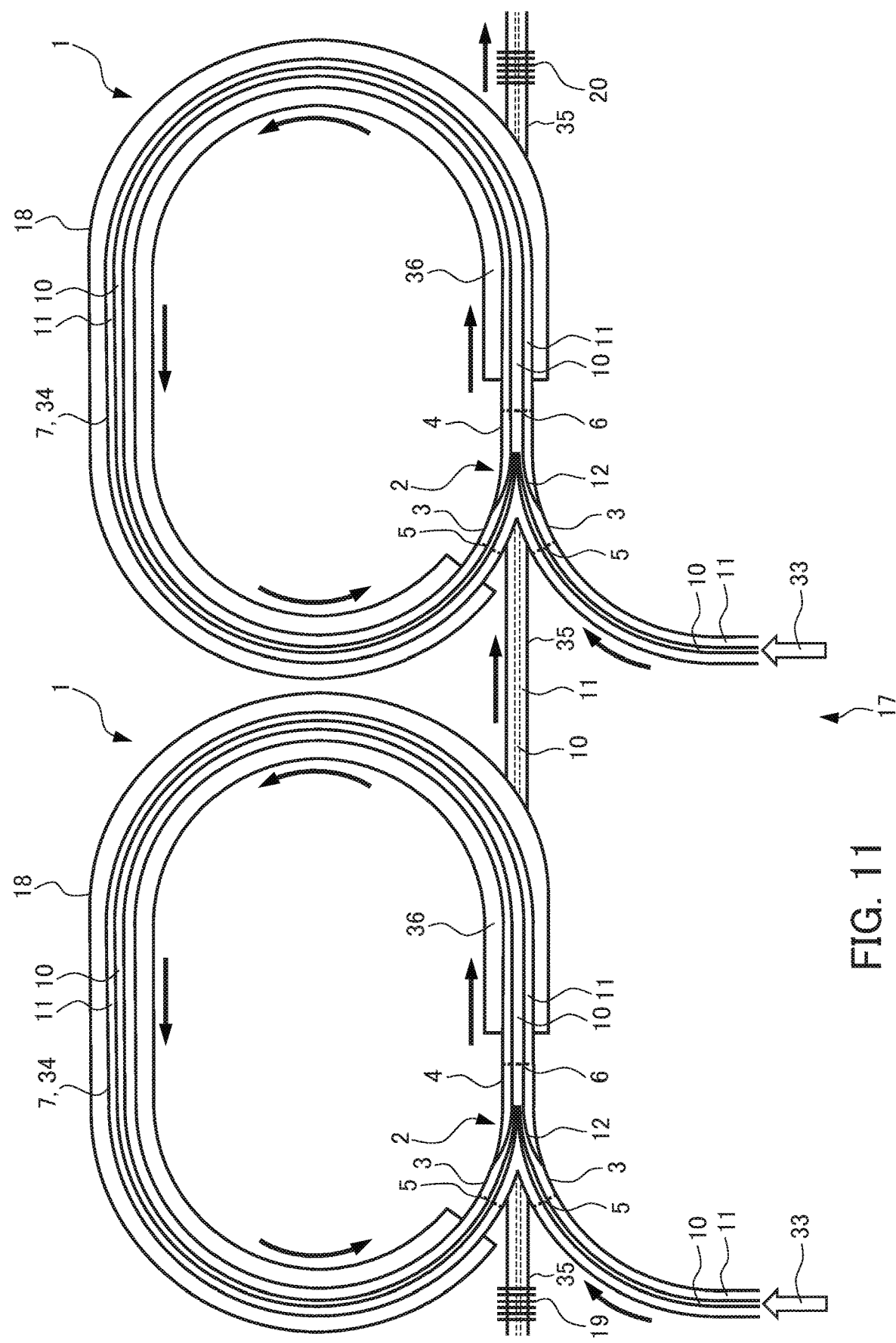
FIG. 11 is a schematic view showing the configuration of a fiber laser oscillator in a fiber laser apparatus according to a ninth embodiment of the present invention.

FIG. 11 is a schematic view showing the configuration of a fiber laser oscillator in a fiber laser apparatus according to a ninth embodiment of the present invention. FIG. 11 shows a schematic cross-sectional view where a plane including the center line of two front excitation light optical fibers 34, 34 to which a loop-shaped optical fiber 1 is applied is the cross section. In the part of an amplification optical fiber 18, a signal light optical fiber 35 is arranged behind the front excitation light optical fibers 34. As in the present embodiment, by dividing a side pumping structure into a plurality of parts and arranging the parts so as to be displaced, it becomes easy to dissipate heat which is generated by the absorption of excitation light into the core 10 of the signal light optical fiber 35. Consequently, reaching an operational limit due to an increase in the temperature of the part of the side pumping structure is easily prevented, and thus it is possible to realize high power and high reliability in the fiber laser apparatus.

Tenth Embodiment

Figure 12:
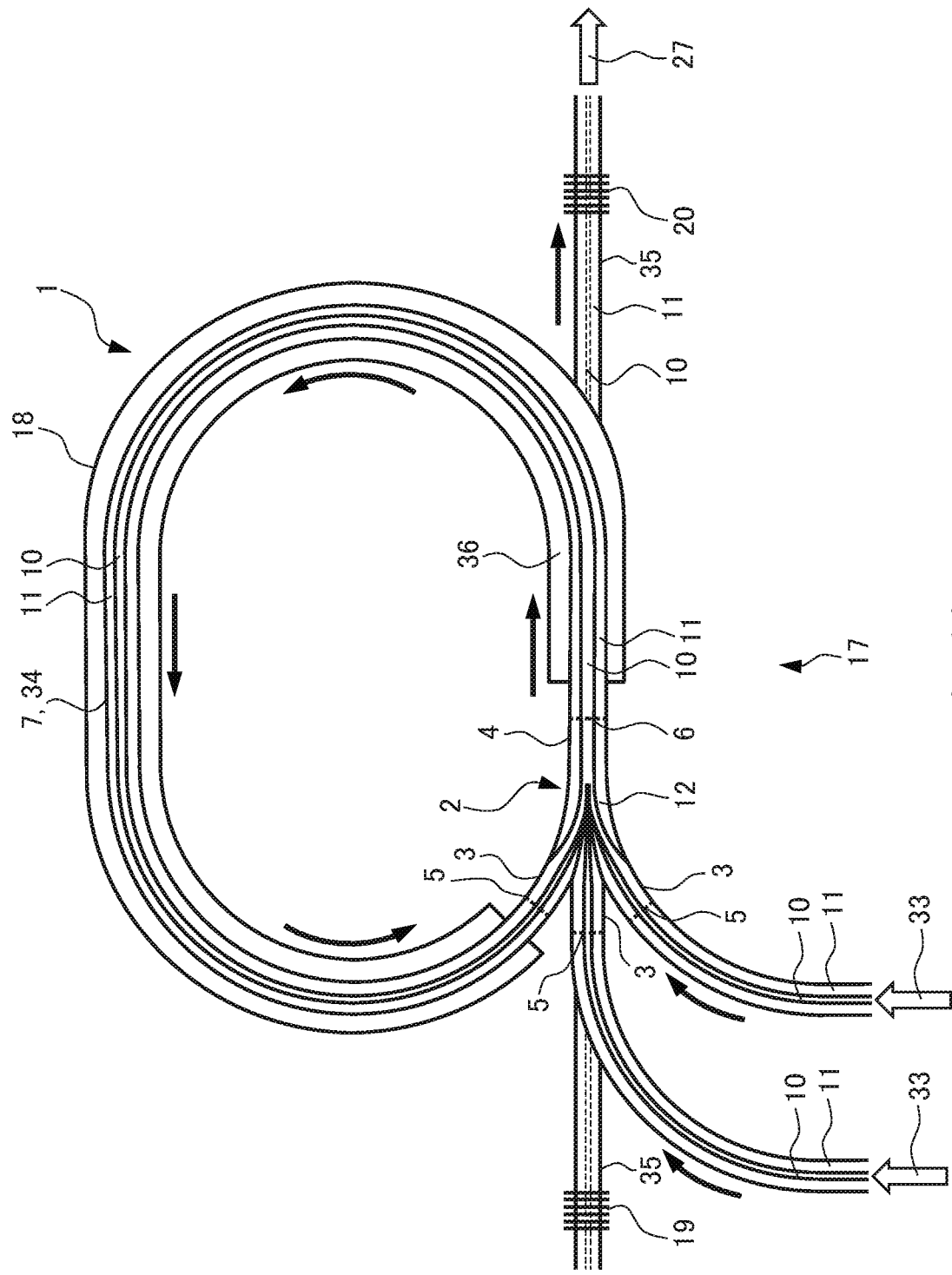
FIG. 12 is a schematic view showing the configuration of a fiber laser oscillator in a fiber laser apparatus according to a tenth embodiment of the present invention.

FIG. 12 is a schematic view showing the configuration of a fiber laser oscillator in a fiber laser apparatus according to a tenth embodiment of the present invention. FIG. 12 shows a schematic cross-sectional view where a plane including the center line of the front excitation light optical fibers 34 to which a loop-shaped optical fiber 1 is applied is the cross section. In the part of an amplification optical fiber 18, a signal light optical fiber 35 is arranged behind the front excitation light optical fibers 34. In the present embodiment, the number of input side optical fibers 3 in the combiner 2 of the loop-shaped optical fiber 1 is three, and from the two input side optical fibers 3, 3 among them, excitation light can enter a side pumping structure. By increasing the number of input side optical fibers 3, a larger amount of excitation light 33 easily enters the side pumping structure, with the result that it becomes easy to realize the high power of the fiber laser apparatus. When the loop-shaped optical fiber 1 is applied to the side pumping structure, the number of input side optical fibers 3 in the combiner 2 is not limited to two or three.

Eleventh Embodiment

Figure 13:
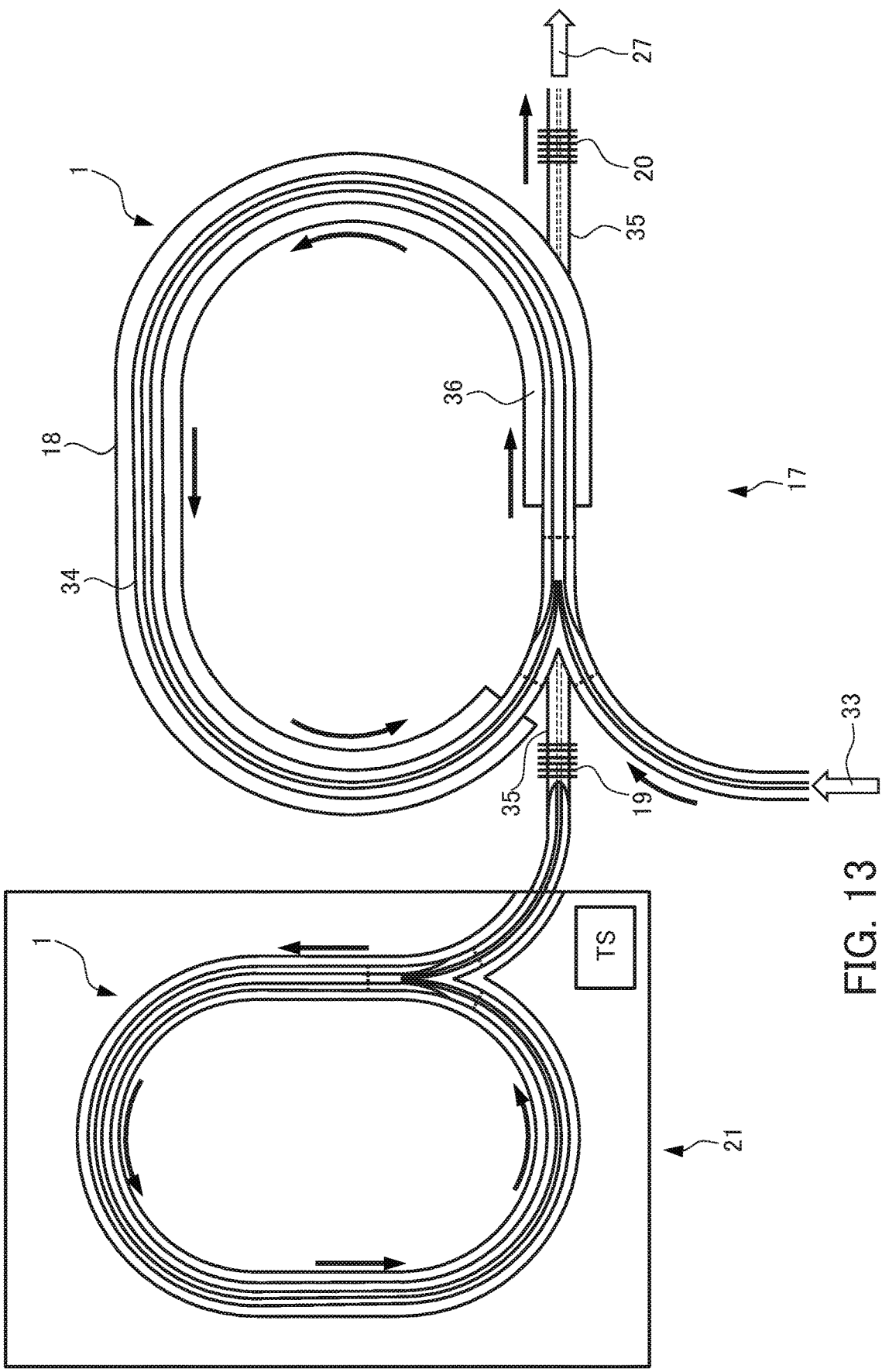
FIG. 13 is a schematic view showing the configurations of a fiber laser oscillator and a return light elimination module in a fiber laser apparatus according to an eleventh embodiment of the present invention.

FIG. 13 is a schematic view showing the configurations of a fiber laser oscillator and a return light elimination module in a fiber laser apparatus according to an eleventh embodiment of the present invention. In the present embodiment, a loop-shaped optical fiber 1 is applied both to the return light elimination module 21 for eliminating return light which is passed from the signal light optical fiber 35 of the fiber laser oscillator 17 through a HRFBG 19 and to an excitation light optical fiber 34 which is adjacent to the signal light optical fiber 35 of the fiber laser oscillator 17 so as to be extended parallel thereto. In FIG. 13, for ease of understanding of the drawing, the fiber laser oscillator 17 is shown by a schematic cross-sectional view in which a plane including the center line of the excitation light optical fiber 34 is the cross section, and the return light elimination module 21 is shown by a schematic cross-sectional view in which a plane including the center line of the loop-shaped optical fiber 1 within the return light elimination module 21 is the cross section. Hence, FIG. 13 corresponds to a drawing in which FIGS. 5A and 7 described previously are combined.

In the fiber laser apparatus of the present embodiment, it is possible to prevent a local temperature rise in the return light elimination module 21, and it is also possible to completely eliminate the return light and to prevent the return light harmful to the fiber laser oscillator 17 from being returned again from the side of the HRFBG 19. Further, within the return light elimination module 21, since the elimination (the leakage from the optical fiber) of the return light is not performed locally, it is possible to prevent a failure in which the temperature is locally increased so as to damage the loop-shaped optical fiber 1 and the return light elimination module 21. The temperature distribution of the amplification optical fiber 18 becomes uniform, and the heat generation rate and the temperature distribution in the length direction of the amplification optical fiber become substantially uniform. Even without elongating the length of the fiber, almost all of the entering excitation light 33 is absorbed into the signal light optical fiber 35, and thus while the amplification optical fiber 18 is set to have the most appropriate length as the laser oscillator, the ratio of the laser light which does not contribute to the excitation can be reduced. Hence, since the output of the fiber laser oscillator 17 is unlikely to receive a restriction resulting from an operational limit caused by an increase in the temperature of the amplification optical fiber 18 and the occurrence of nonlinear induced scattering such as SRS, the fiber laser oscillator 17 can efficiently perform excitation with the high-power excitation light 33 while reducing the generation of Raman scattering light. Hence, it is possible to realize a high-power, highly-efficient fiber laser apparatus which is reliable.

EXPLANATION OF REFERENCE NUMERALS

1 loop-shaped optical fiber
2 combiner (of loop-shaped optical fiber)
3 input side optical fiber (of combiner)
4 output side optical fiber (of combiner)

5 input end (of input side optical fiber of combiner)
6 output end (of output side optical fiber of combiner)
7 optical fiber for connection of both ends
8 entrance light
9 leakage range in which light entering optical fiber for connection of both ends leaks from optical fiber for connection of both ends to outside of optical fiber for connection of both ends, range in which optical fiber for connection of both ends includes light leakage means
10 core (of each optical fiber)
11 cladding (of each optical fiber)
12 fiber taper portion (of combiner)
13 entrance light fiber
14 over-cladding tube
15 dummy fiber
16 fiber laser apparatus
17 fiber laser oscillator
18 amplification optical fiber
19 high-reflecting fiber Bragg grating (HRFBG)
20 output coupler-fiber Bragg grating (OCFBG)
21 return light elimination module
22 laser diode modules (LDM)
23 tapered fiber bundle (TFB)
24 laser optical system
25 delivery fiber
26 machining head
27 output laser light
28, 28a, 28b light detection means
29 thermal conductive member
291 groove
30 temperature sensor
31 thermally conductive fixing material
32 (output laser light combination) combiner
33 excitation light
34 excitation light optical fiber (for side pumping)
35 signal light optical fiber
36 sleeve
37 end surface of sleeve

What is claimed is:

1. A fiber laser apparatus which includes a fiber laser oscillator that is excited by laser light from at least one laser diode module so as to perform laser oscillation, the fiber laser apparatus comprising:
a loop-shaped optical fiber formed with: a combiner in which at least two input side optical fibers each including input ends are connected to one output side optical fiber including one output end; and an optical fiber for connection of both ends in which the output end of the output side optical fiber in the combiner is connected to the input end of any one of the input side optical fibers,
wherein the optical fiber for connection of both ends includes a light leakage means configured such that at least one of values among a numerical aperture, a core diameter and a mode field diameter of the optical fiber for connection of both ends is gradually reduced from a side which is connected to the output end of the output side optical fiber toward a side which is connected to the input end of the input side optical fiber.

2. The fiber laser apparatus according to claim 1, wherein the loop-shaped optical fiber is not provided with a light extraction means nor a light branch means which extract light propagated within the loop-shaped optical fiber from the loop-shaped optical fiber, except for the light leakage means.

3. The fiber laser apparatus according to claim 1, wherein the combiner satisfies a relationship of (a diameter of an entire branch of the input side optical fibers)×(a numerical aperture of the input side optical fibers)≤(a core diameter of the output side optical fiber)×(a numerical aperture of the output side optical fiber).

4. The fiber laser apparatus according to claim 1, wherein, with regards to a first relational formula group including three relational formulas $NA_1 \leq NA_2$, $D_1 \leq D_2$ and $MFD_1 \leq MFD_2$ wherein the numerical aperture, the core diameter and a mode field diameter of the output side optical fiber in a position in which the output side optical fiber and the optical fiber for connection of both ends are connected together are respectively represented as $NA_1$, $D_1$ and $MFD_1$, and the numerical aperture, the core diameter and the mode field diameter of the optical fiber for connection of both ends in the position in which the output side optical fiber and the optical fiber for connection of both ends are connected together are respectively represented as $NA_2$, $D_2$ and $MFD_2$,
as well as to a second relational formula group including three relational formulas $NA_3 \leq NA_4$, $D_3 \leq D_4$ and $MFD_3 \leq MFD_4$ wherein the numerical aperture, the core diameter and the mode field diameter of the optical fiber for connection of both ends in a position in which the optical fiber for connection of both ends and the input side optical fiber are connected together are respectively represented as $NA_3$, $D_3$ and $MFD_3$, and the numerical aperture, a core diameter and a mode field diameter of the input side optical fiber in the position in which the optical fiber for connection of both ends and the input side optical fiber are connected together are respectively represented as $NA_4$, $D_4$ and $MFD_4$,
the loop-shaped optical fiber is configured such that all the relational formulas included in the first and second relational formula groups hold true.

5. The fiber laser apparatus according to claim 1, wherein the loop-shaped optical fiber forms a plurality of loops.

6. The fiber laser apparatus according to claim 1, wherein, when the input side optical fibers are bundled in a hexagonal close-packed structure, the number of the input side optical fibers in the combiner is set such that a cross-sectional outer shape of the bundle is close to a circle.

7. The fiber laser apparatus according to claim 1, wherein the loop-shaped optical fiber is applied to a return light elimination module for eliminating return light which is propagated in a direction opposite to output laser light from a signal light optical fiber of the fiber laser oscillator and which is passed through a high-reflecting fiber Bragg grating.

8. The fiber laser apparatus according to claim 7, wherein at least part of the loop-shaped optical fiber is thermally connected to a thermal conductive member which is thermally connected to a heat dissipation means.

9. The fiber laser apparatus according to claim 7, comprising: a light detection means which detects light that leaks from the optical fiber between the return light elimination module and the high-reflecting fiber Bragg grating.

10. The fiber laser apparatus according to claim 1, wherein the loop-shaped optical fiber is applied to an excitation light optical fiber for side pumping which is adjacent to a signal light optical fiber of the fiber laser oscillator so as to be extended parallel thereto.

11. The fiber laser apparatus according to claim 10, wherein at least part of the excitation light optical fiber which is adjacent to the signal light optical fiber so as to be extended parallel thereto and the signal light optical fiber is covered with a sleeve which has a refractive index lower than that of a cladding of the signal light optical fiber.

12. The fiber laser apparatus according to claim 10, wherein a plurality of the excitation light optical fibers are arranged adjacent to the one signal light optical fiber.

13. The fiber laser apparatus according to claim 10, wherein a plurality of the excitation light optical fibers are arranged adjacent to the one signal light optical fiber, and a direction in which light is propagated through at least one among a plurality of the excitation light optical fibers is opposite to a direction in which light is propagated through the other excitation light optical fiber.

14. The fiber laser apparatus according to claim 1, wherein the loop-shaped optical fiber is applied both to a return light elimination module for eliminating return light which is propagated in a direction opposite to output laser light from a signal light optical fiber of the fiber laser oscillator and which is passed through a high-reflecting fiber Bragg grating and to an excitation light optical fiber for side pumping which is adjacent to the signal light optical fiber of the fiber laser oscillator so as to be extended parallel thereto.

\* \* \* \* \*